US012730396B2

(12) United States Patent
Hotomi

(10) Patent No.: US 12,730,396 B2
(45) Date of Patent: Sep. 8, 2026

(54) IMAGE FORMING APPARATUS

(71) Applicant: CANON KABUSHIKI KAISHA, Tokyo (JP)

(72) Inventor: Daigo Hotomi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/065,700

(22) Filed: Feb. 27, 2025

(65) Prior Publication Data

US 2025/0278040 A1 Sep. 4, 2025

(30) Foreign Application Priority Data

Feb. 29, 2024 (JP) ................................ 2024-030753

(51) Int. Cl.
*G03G 15/16* (2006.01)
*G03G 21/00* (2006.01)

(52) U.S. Cl.
CPC ....... *G03G 15/168* (2013.01); *G03G 15/1675* (2013.01); *G03G 21/0011* (2013.01); *G03G 15/161* (2013.01)

(58) Field of Classification Search
CPC ............. G03G 15/168; G03G 15/1675; G03G 21/0011; G03G 15/161; G03G 15/5012; G03G 2215/00599; G03G 15/6564; G03G 2215/00603
See application file for complete search history.

(56) References Cited

U.S. PATENT DOCUMENTS

2015/0338784 A1* 11/2015 Ai ........................ G03G 15/161 399/101
2019/0146380 A1* 5/2019 Kakomura ........... G03G 15/161 399/71

FOREIGN PATENT DOCUMENTS

JP 2014-052577 A 3/2014
JP 2019-152884 A 9/2019
JP 2020-008613 A 1/2020

* cited by examiner

*Primary Examiner* — Sandra Brase
(74) *Attorney, Agent, or Firm* — Venable LLP

(57) ABSTRACT

An image forming apparatus includes an image forming portion, an intermediary transfer member, a secondary transfer member, a cleaning blade, first and second feeding portions, and a controller. In the case where a recording material feeding source is changed from the first feeding portion to the second feeding portion, when a position of a leading end of an untransferred toner image is an untransferred toner image leading end, and a position of a leading end of an image forming region in which a first toner image after resumption of image formation is formable is a post-resumption image leading end, the controller controls the image forming portion to carry out control in which the image formation is resumed so that the untransferred toner image leading end first passes through a primary transfer portion and then the post-resumption image leading end first reaches the primary transfer portion.

14 Claims, 14 Drawing Sheets

IMAGE FORMING APPARATUS

FIELD OF THE INVENTION AND RELATED ART

The present invention relates to an image forming apparatus, such as a copying machine, a printer, or a facsimile machine, or a multi-function machine having a plurality of functions of these machines and being of an electrophotographic type or an electrostatic recording type.

Conventionally, for example, as the image forming apparatus such as the copying machine of the electrophotographic type, there is an image forming apparatus employing an intermediary transfer type method. In the image forming apparatus of the intermediary transfer type, a toner image formed on an image bearing member is transferred onto an intermediary transfer member in a primary transfer portion, and this toner is secondarily transferred onto a recording material such as paper in a secondary transfer portion. As the image bearing member, a photosensitive drum, which is a drum type photosensitive member (electrophotographic photosensitive member), is used in many cases. Further, as the intermediary transfer member, an intermediary transfer belt constituted by an endless belt is used in many cases. The recording material is, for example, accommodated in a cassette as a feeding portion, and is fed from the cassette toward the secondary transfer portion. Further, toner (transfer residual toner) remaining on the intermediary transfer belt without being transferred onto the recording material in the secondary transfer portion is removed by a belt cleaning device. As the belt cleaning device, a belt cleaning device of a belt cleaning type provided with a cleaning blade constituted by a plate-like elastic member as a cleaning member is used in many cases. The cleaning blade is constituted of a rubber material such as urethane rubber and is contacted to a surface of the intermediary transfer belt so that a direction thereof becomes a counter direction to a movement direction of the surface of the intermediary transfer belt.

In such an image forming apparatus, during continuous image formation in which images are formed on a plurality of recording materials, run out of the recording materials in the cassette (herein, also referred to as "sheet (paper) absence") is detected in some instances. In this case, the image forming apparatus is provided with a function of continuing the continuous image formation by automatically switching a feeding source of the recording material to another cassette in which the recording materials of the same kind are accommodated in some instances (herein, this switching is also referred to as "automatic feeding portion switching"). Further, the image forming apparatus of the intermediary transfer type has a constitution in which image formation (specifically formation of an electrostatic latent image on a photosensitive drum by exposure to light) is started prior to a start of a recording material feeding operation for the purpose of improvement of productivity or the like in some instances. In this case, when the sheet absence is detected, formation of the image on a subsequent recording material has already been started. For that reason, in this case, the image formation has already been started when the sheet absence is detected, and therefore, a toner image (herein, also referred to as a "untransferred toner image") transferred onto the intermediary transfer belt is removed by the belt cleaning device, and then the image formation of the same page as the untransferred toner image is resumed.

Japanese Laid-Open Patent Application No. 2019-152884 proposes that in the case where the automatic feeding portion switching is performed, image formation is resumed before cleaning of a secondary transfer member on which toner is deposited by passing of the untransferred toner image through secondary transfer portion is ended. By this, immediately after the cleaning of the secondary transfer member is ended, the toner image of the same page as the untransferred toner image is made capable of being transferred onto the recording material fed from a cassette switched from another cassette.

However, the untransferred toner image is large in toner application amount of the toner on the intermediary transfer belt and contains toner with high flowability in a large amount. For that reason, when the untransferred toner image is conveyed to a cleaning nip which is a contact portion between cleaning blade and an intermediary transfer belt there is a possibility that a phenomenon that the toner slips through the cleaning blade (herein, this phenomenon is also referred to as "slipping-through (phenomenon)") occurs. The toner slipped through the cleaning blade causes an image defect (slipping-through image) by being transferred onto the recording material after the automatic feeding portion switching.

SUMMARY OF THE INVENTION

Therefore, a principal object of the present invention is to suppress an image defect, in a subsequent image due to toner of an untransferred toner image on an intermediary transfer member, caused to occur due to automatic feeding portion switching.

The object has been accomplished by an image forming apparatus according to the present invention.

According to an aspect of the present invention, there is provided an image forming apparatus comprising: an image forming portion including a rotatable image bearing member and configured to carry out image formation in which a toner image is formed on the image bearing member; a rotatable intermediary transfer member onto which the toner image is primarily transferred from the image bearing member in a primary transfer portion; a secondary transfer member configured to form a secondary transfer portion in which the toner image is secondarily transferred from the intermediary transfer member onto a recording material; a cleaning blade configured to clean a surface of the intermediary transfer member in contact with the surface of the intermediary transfer member in a cleaning position downstream of the secondary transfer portion and upstream of the primary transfer portion with respect to a movement direction of the intermediary transfer member; a first feeding portion and a second feeding portion which are each configured to feed the recording material toward the secondary transfer portion; and a controller configured to control the image forming portion, the controller, when the recording material being fed from the first feeding portion runs out while image formation is in process, interrupting the image formation, and then controlling the image forming portion to resume image formation with recording material fed from the second feeding portion, wherein in a case where the feeding source of the recording material is changed from the first feeding portion to the second feeding portion after the recording material is absent in the first feeding portion, when a toner image passing through the secondary transfer portion without being transferred onto the recording material before the recording material fed from the second feeding portion reaches the secondary transfer portion is an untransferred toner image, a position of a leading end of the untransferred toner image on the intermediary transfer member with respect to a conveying direction of the intermediary transfer member is an untransferred toner image leading end, a position of a leading end of an image forming region, on the image bearing member with respect to a conveying direction of the image bearing member, in which a first toner image after resumption of the image formation is formable is a post resumption image leading end, and a timing when a position of the intermediary transfer member on which the untransferred toner image leading end is transferred passes through the cleaning position and then first passes through the primary transfer portion is a first timing, the controller controls the image forming portion to carry out control in which the image formation is resumed so that a timing when the post resumption image leading end first reaches the primary transfer portion is a second timing after the first timing.

Further features of the present invention will become apparent from the following description of exemplary embodiments with reference to the attached drawings.

Figure 9:
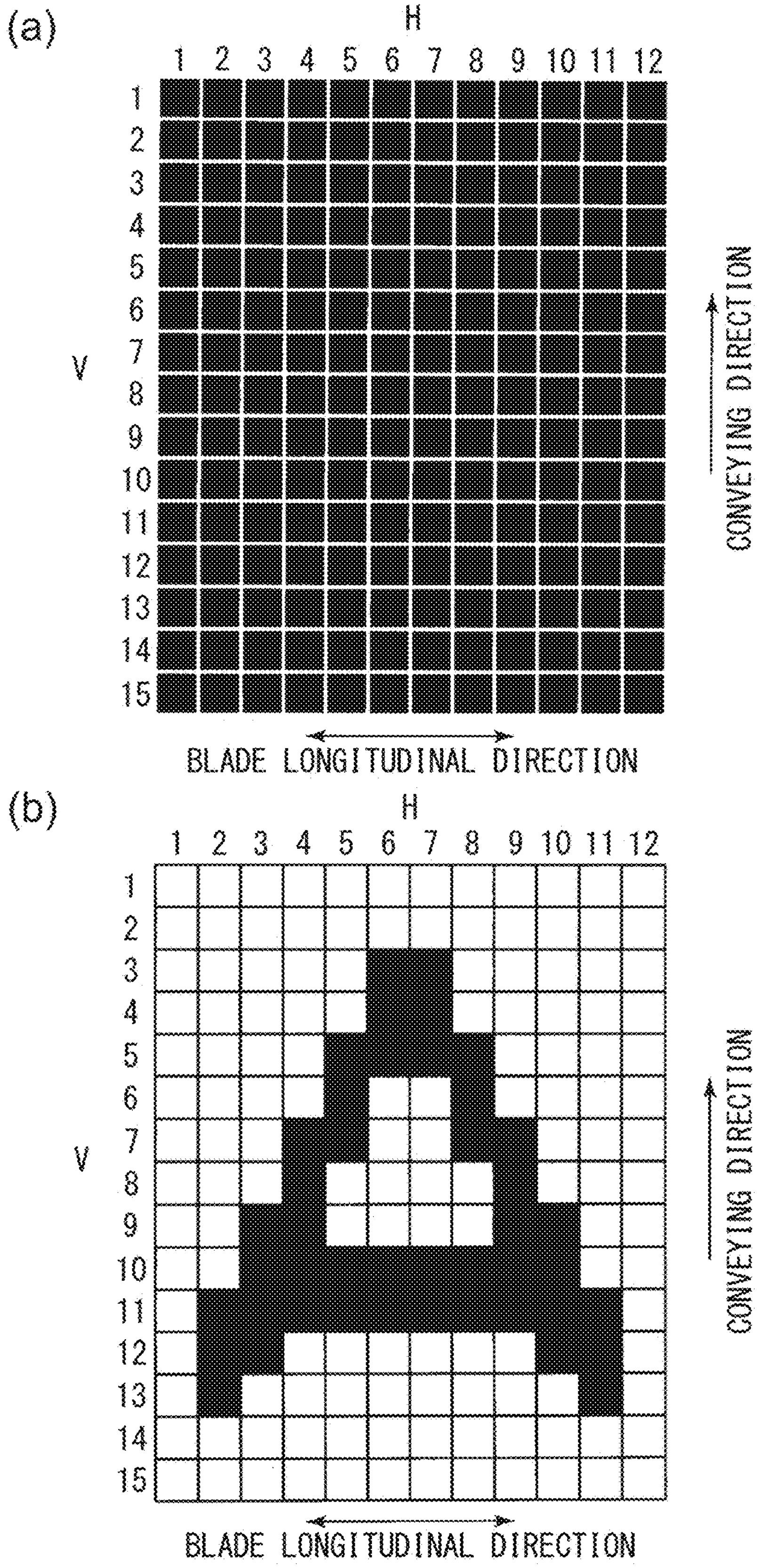

Parts (a) and (b) of FIG. 9 are schematic views for illustrating untransferred toner image leading ends.

Figure 10:
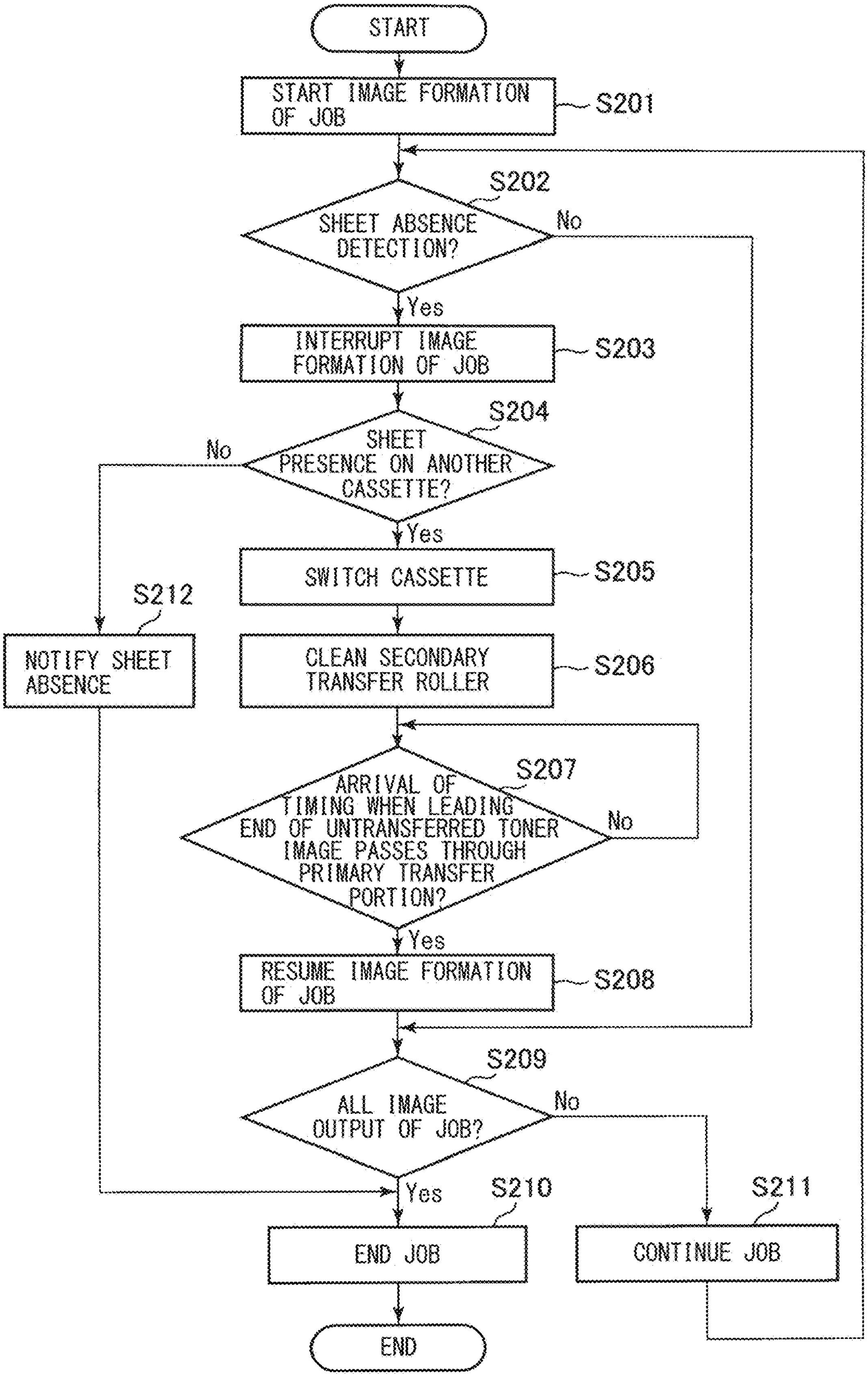

FIG. 10 is a flowchart for illustrating an outline of control in an embodiment.

Figure 11:
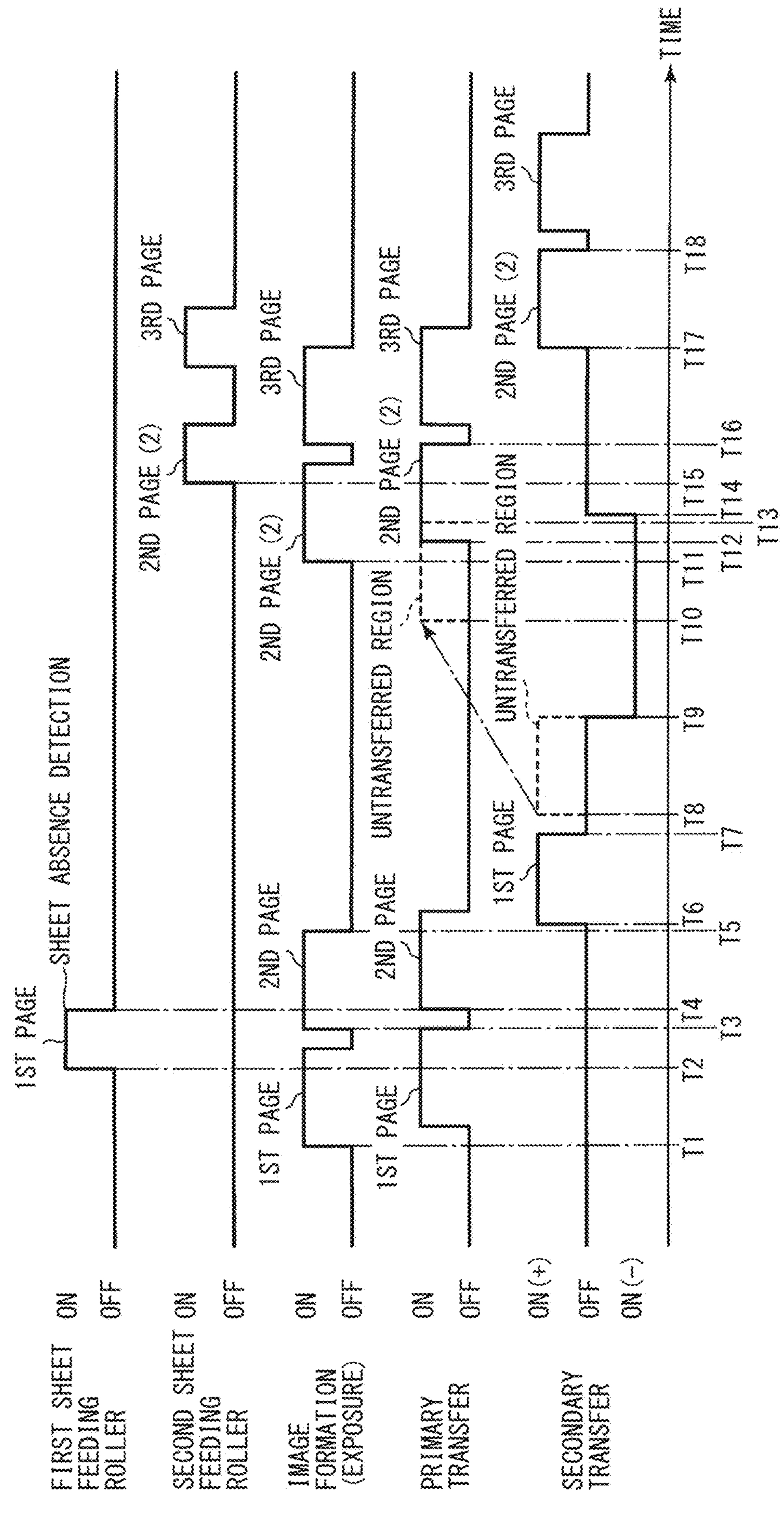

FIG. 11 is a timing chart for illustrating an example of an operation in the embodiment.

Figure 12:
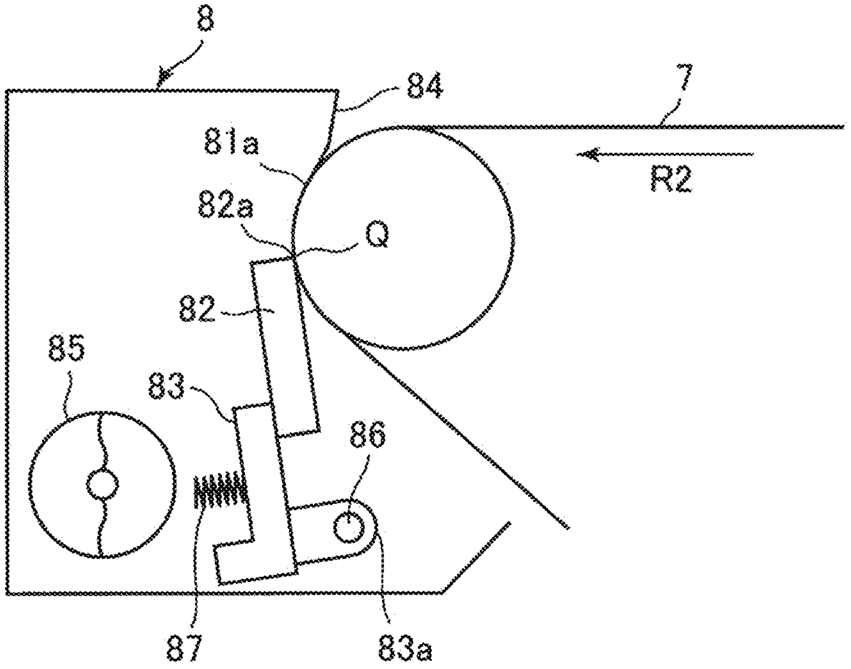

FIG. 12 is a schematic sectional view showing another example of a belt cleaning device.

Figure 13:
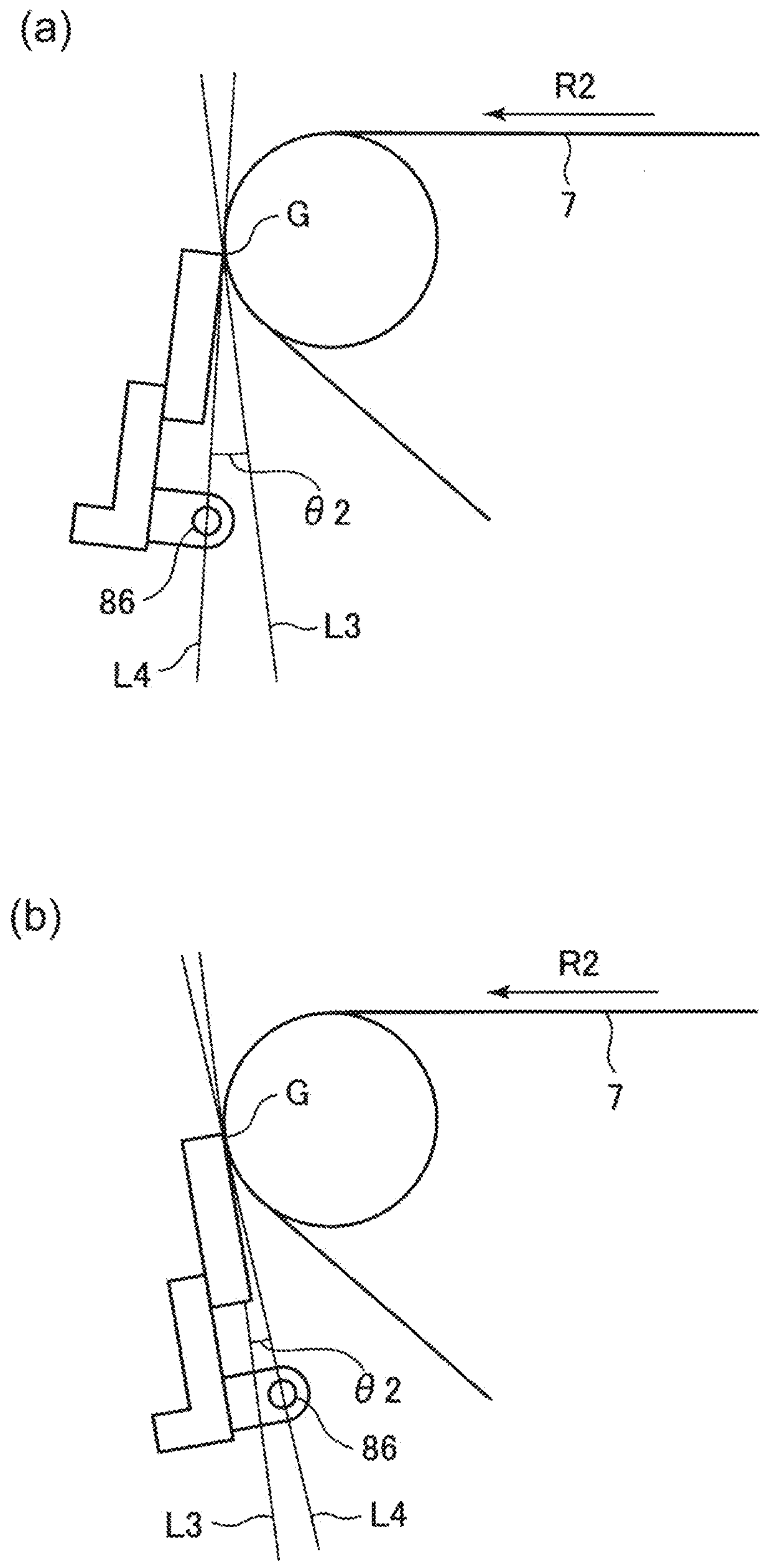

Parts (a) and (b) of FIG. 13 are schematic sectional views each for illustrating a switch angle of the cleaning blade.

Figure 14:
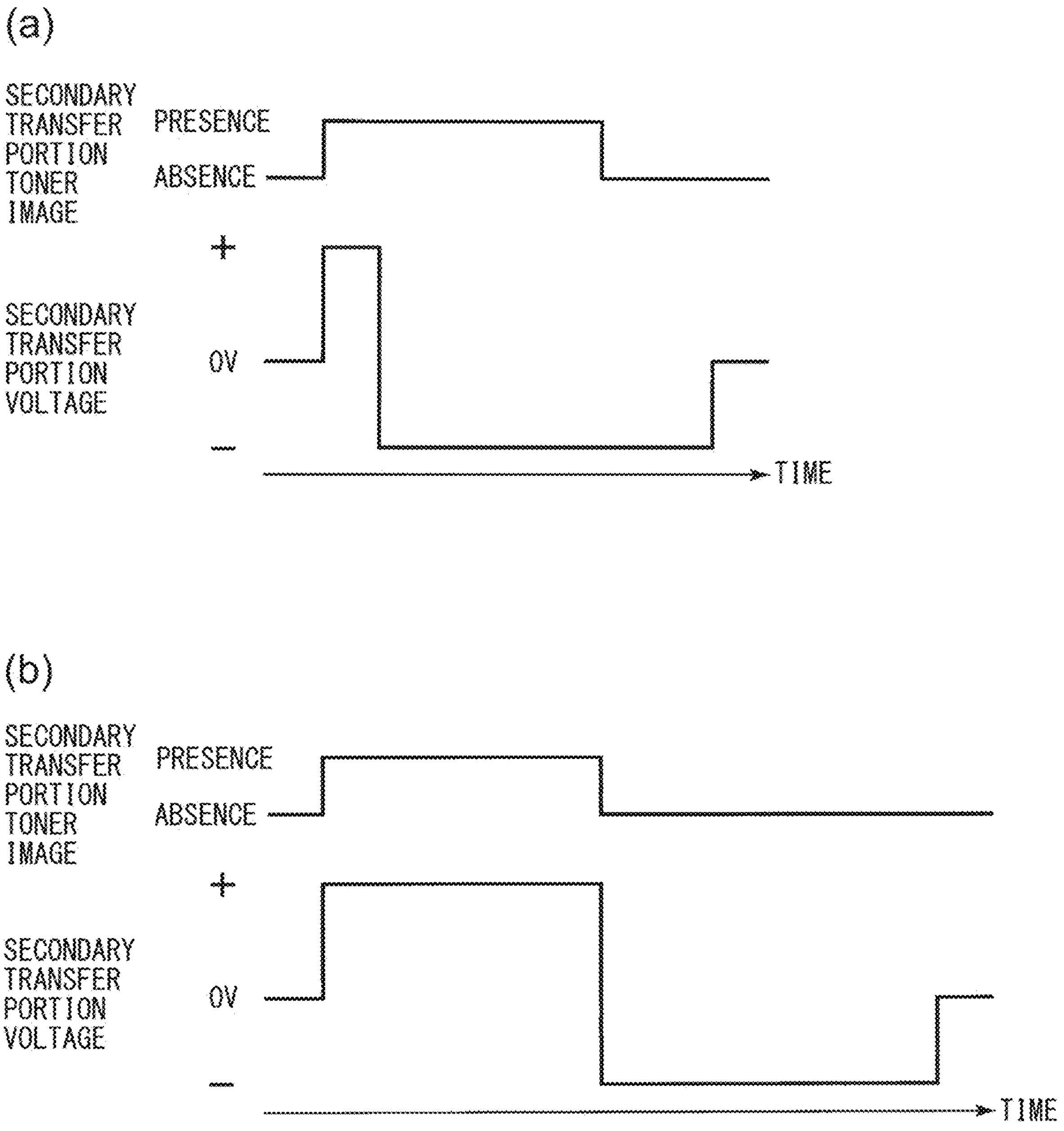

Parts (a) and (b) of FIG. 14 are timing charts each for illustrating an example of a voltage in a secondary transfer portion when an untransferred toner image passes through the secondary transfer portion.

Figure 15:
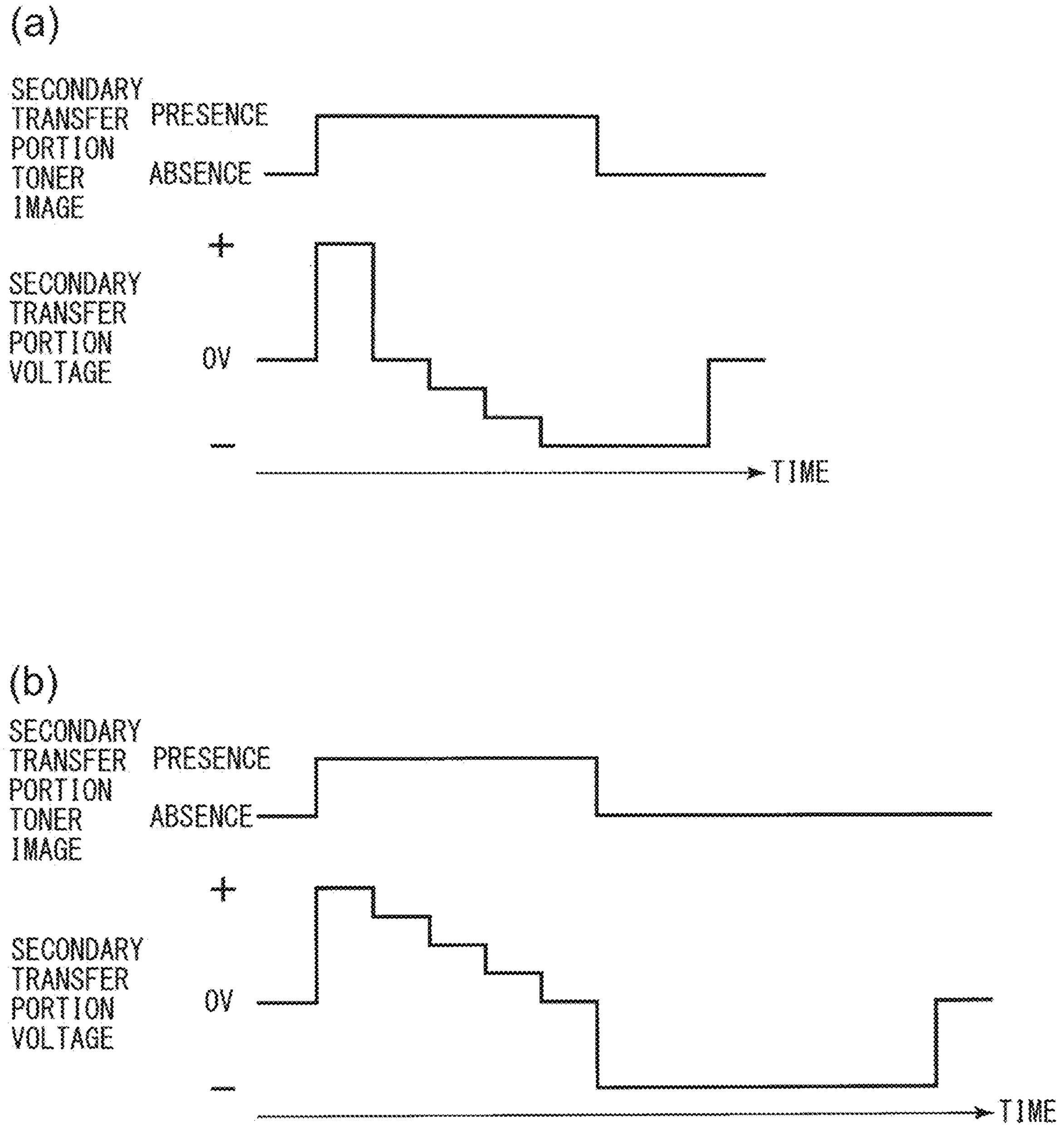

Parts (a) and (b) of FIG. 15 are timing charts each for illustrating another example of a voltage in the secondary transfer portion when the untransferred toner image passes through the secondary transfer portion.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
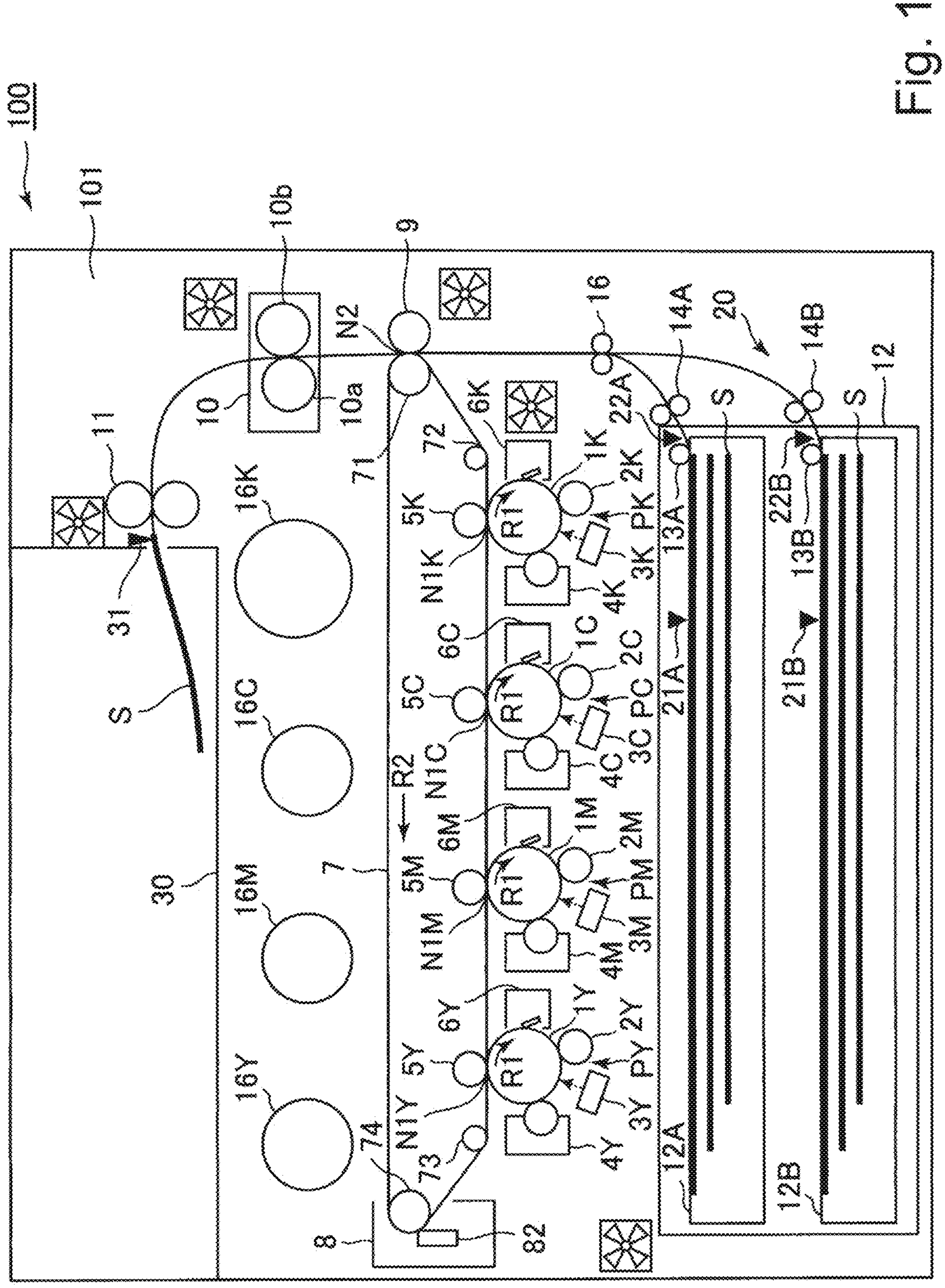
FIG. 1 is a schematic sectional view of an image forming apparatus.

FIG. 1 is a schematic sectional view of an image forming apparatus 100 of an embodiment 1. The image forming apparatus 100 of this embodiment is a tandem laser beam printer which is capable of forming a full-color image with use of an electrophotographic type system and which employs an intermediary transfer type method. The image forming apparatus 100 is capable of forming an image on a sheet-like recording material S depending on an image signal (image information) received from an external device such as a personal computer. Incidentally, in the image forming apparatus 100, paper is principally used as the recording material S, and therefore, the recording material S is referred to as paper in some instances, but is not limited to paper. As the recording material S, for example, it is also possible to use materials other than paper or additional materials containing the materials other than paper, including synthetic paper, a film constituted of materials principally comprising a synthetic resin, special paper such as metallized paper including a metal layer, and the like material.

Figure 2:
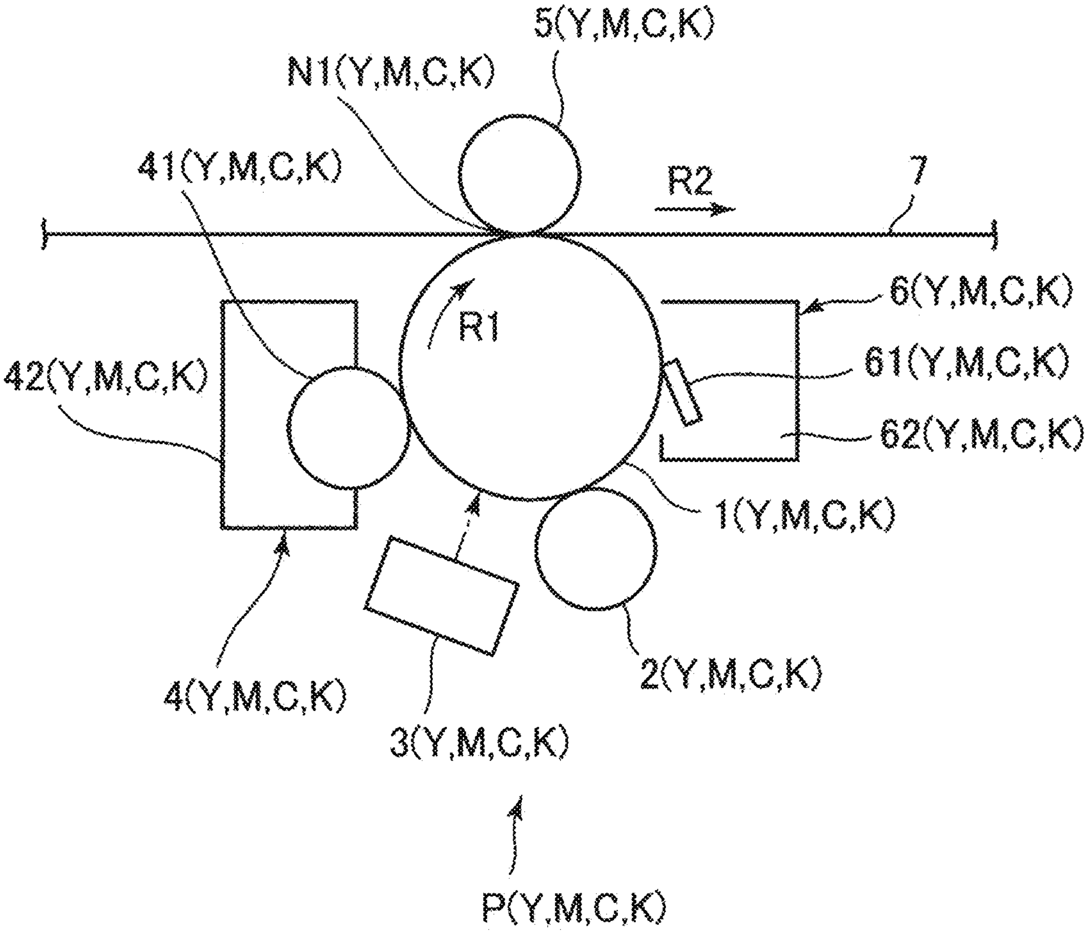
FIG. 2 is a schematic sectional view of an image forming portion.

The image forming apparatus 100 includes, as a plurality of image forming portions (stations), image forming portions PY, PM, PC, and PK for forming images of yellow (Y), magenta (M), cyan (C), and black (K), respectively. The four image forming portions PY, PM, PC, and PK are provided and arranged linearly in the named order along a movement direction (conveying direction, advancing direction, traveling direction) of a surface of an intermediary transfer belt 7 (described later). Incidentally, elements which are provided for the respective colors and which have the same or corresponding functions or constitutions are collectively described in some instances by omitting suffixes Y, M, C and K of reference numerals or symbols indicating constituent elements for either of the colors. FIG. 2 is a schematic sectional view of the image forming portion P. In this embodiment, the image forming portion P is constituted by including a photosensitive drum 1 (1Y, 1M, 1C, 1K), a charging roller 2 (2Y, 2M, 2C, 2K), an exposure device 3 (3Y, 3M, 3C, 3K), a developing device 4 (4Y, 4M, 4C, 4K), a drum cleaning device 6 (6Y, 6M, 6C, 6K), and the like.

The photosensitive drum 1 which is a rotatable drum-like (cylindrical) electrophotographic photosensitive member (photosensitive member) as an image bearing member) is rotationally driven at a predetermined peripheral speed (surface moving speed) in an arrow R1 direction (clockwise direction). The photosensitive drum 1 is rotationally driven by transmitting thereto a driving force from a drum driving motor D1 (FIG. 3) as a driving means.

A surface of the rotating photosensitive drum 1 is electrically charged substantially uniformly to a predetermined polarity (negative polarity in this embodiment) and to a predetermined potential. During charging, to the charging roller 2, a predetermined charging voltage (charging bias) is applied by a charging power source E1 (FIG. 3) as a charging voltage applying means (charging voltage applying portion). In this embodiment, to the charging roller 2, as the charging voltage, an oscillating voltage in the form of a superposition of a DC voltage and an AC voltage is applied. Incidentally, with respect to a rotational direction of the photosensitive drum 1, on each of sides upstream and downstream of a contact portion between the photosensitive drum 1 and the charging roller 2, a minute gap between the photosensitive drum 1 and the charging roller 2 is formed.

The charging roller 2 charges the surface of the photosensitive drum 1 by electric discharge generating in at least one of these gaps on the sides upstream and downstream of the contact portion.

The charged surface of the photosensitive drum 1 is subjected to scanning exposure by the exposure device (laser scanner) 3 as an exposure means, so that an electrostatic latent image (electrostatic image) is formed on the photosensitive drum 1. The exposure device 3 irradiates the surface of the photosensitive drum 1 with laser light on the basis of an image signal, and thus forms the electrostatic latent image on the photosensitive drum 1. Incidentally, the exposure device 3 may also be constituted as a single unit for subjecting the four photosensitive drums 1Y, 1M, 1C, and 1K to exposure to light.

The electrostatic latent image formed on the photosensitive drum 1 is developed (visualized) by being supplied with toner by the developing device 4 as a developing means, so that a toner image (toner picture, developer image) is formed on the photosensitive drum 1. In this embodiment, the developing device 4 uses, as a developer, a two-component developer in which a carrier (magnetic carrier particles) and toner (non-magnetic toner particles) are mixed with each other (details of the developer will be described later). The developing device 4 includes a developing sleeve 41 as a developer carrying member (developing member) and a developing container 42 for accommodating the developer. The developing sleeve 41 carries and conveys the developer to a developing portion which is an opposing portion to the photosensitive drum 1, so that the toner is deposited on the photosensitive drum 1 depending on the electrostatic latent image on the photosensitive drum 1. During the development, to the developing sleeve 41, a driving force is transmitted from, for example, a drum driving motor D1, so that the developing sleeve 41 is rotationally driven. Further, during development, to the developing sleeve 41, a predetermined developing voltage (developing bias) is applied from a developing power source E2 as a developing voltage applying means (applying portion). In this embodiment, to the developing sleeve 4, as the developing voltage, an oscillating voltage in the form of superimposition of a DC voltage and an AC voltage is applied. In this embodiment, the toner image is formed by image portion exposure and reverse development. That is, on an exposure portion (image portion) of the photosensitive drum 1 where an absolute value of the potential is lowered by the exposure to light after the photosensitive drum surface is substantially uniformly charged, the toner charged to the same polarity (negative polarity in this embodiment) as a charge polarity of the photosensitive drum 1 is deposited. In this embodiment, a normal charge polarity of the toner which is a principal charge polarity of the toner during the development is the negative polarity. In this embodiment, a normal charge polarity of the toner which is a principal charge polarity of the toner during development is the negative polarity. Further, the toner in an amount corresponding to a consumption amount of the toner by development is supplied from each of toner bottles 16Y, 16M, 16C, and 16K to an associated one of the developing devices 4Y, 4M, 4C, and 4K.

The intermediary transfer belt 7 constituted by an endless belt as an intermediary transfer member is provided opposed to the four photosensitive drums 1Y, 1M, 1C, and 1K. The intermediary transfer belt 7 is extended around, as a plurality of supporting rollers (stretching rollers), a driving roller 71, a downstream auxiliary roller 72, an upstream auxiliary roller 73, and a tension roller 74, and is stretched under predetermined tension. The driving roller 71 is rotationally driven by transmitting thereto a driving force from a belt driving motor B2 (FIG. 3) as a driving means. To the intermediary transfer belt 7, the driving force is transmitted by the rotational drive of the driving roller 71, so that the intermediary transfer belt 7 is rotated (circulated and moved) at a peripheral speed which is substantially equal to the peripheral speed of the photosensitive drum 1. The peripheral speeds (surface moving speeds) of the photosensitive drum 1 and the intermediary transfer belt 7 correspond to the process speed of the image forming apparatus 100. The downstream auxiliary roller 72 and the upstream auxiliary roller 73 form an image transfer surface (flat surface onto which the toner image is primarily transferred) which is disposed substantially parallel to the intermediary transfer belt 7. The tension roller 74 imparts predetermined tension to the intermediary transfer belt 7. On an inner peripheral surface (back surface) side of the intermediary transfer belt 7, correspondingly to the photosensitive drums 1Y, 1M, 1C, and 1K, primary transfer rollers 5Y, 5M, 5C, and 5K which are roller-type primary transfer members as a primary transfer means are provided, respectively. The primary transfer roller 5 is pressed toward the photosensitive drum 1 and is contacted to the photosensitive drum 1 through the intermediary transfer belt 7, so that a primary transfer portion (primary transfer portion) N1 which is a contact portion between the photosensitive drum 1 and the intermediary transfer belt 7 is formed. The primary transfer portion N1 is a position where the toner image is transferred from the photosensitive drum 1 onto the intermediary transfer belt 7. The toner image formed on the photosensitive drum 1 is transferred (primarily-transferred) onto the intermediary transfer belt 7 by the action of the primary transfer roller 5 in the primary transfer portion N1. During primary transfer, to the primary transfer roller 5, a predetermined primary transfer voltage (primary transfer bias) which is a DC voltage of an opposite polarity (positive polarity in this embodiment) to the normal charge polarity of the toner is applied from a primary transfer power source E3 (FIG. 3) as a primary transfer voltage applying means (primary transfer voltage applying portion). For example, during full-color image formation, the toner images of yellow, magenta, cyan, and black formed on the respective photosensitive drums 1 are successively transferred superposedly in the respective primary transfer portions N1.

Here, as a material constituting the intermediary transfer belt 7, a rubber material or a resin material is widely used. In this embodiment, as the intermediary transfer belt 7, a belt (film) formed with PEEK (polyether ether ketone) which is the resin material and molded in an endless-shaped single-layer structure was used. The intermediary transfer belt 7 is adjusted in electric resistance value so as to provide, for example, surface resistivity of $1\times10^{12}$ [Ω/□] and volume resistivity of $1\times10^{9}$ [Ω·cm] by dispersing, for example, carbon black as an electroconductive agent into a resin as a base material. Further, onto a surface of the intermediary transfer belt 7, a lubricant is applied in order to reduce a friction resistance (principally a friction resistance against a cleaning blade 82 described later) of a surface thereof in an initial stage (at the toner image of a new article). As the lubricant, Kaynor, zinc stearate, or the like is widely used. In this embodiment, the zinc stearate was used as the lubricant. Application of the zinc stearate onto the surface of the intermediary transfer belt 7 can be performed in the following manner. That is, powdery zinc stearate is applied in a state of a mixed liquid in which the powdery zinc stearate is mixed in a volatile solvent (HFE (hydrofluoroether) in this embodiment) in a predetermined ratio. By this, onto the surface of the intermediary transfer belt 7, the lubricant can be efficiently applied uniformly.

On an outer peripheral surface (front surface) side of the intermediary transfer belt 7, in a position opposing the driving roller 71 functioning as a secondary transfer opposite roller (inner secondary transfer roller), a secondary transfer roller (outer secondary transfer roller) 9, which is a roller-shaped secondary transfer member as a secondary transfer means, is provided. The secondary transfer roller 9 is pressed toward the driving roller 71 and is contacted to the driving roller 71 through the intermediary transfer belt 7, and forms a secondary transfer portion (secondary transfer nip) N2 which is a contact portion between the intermediary transfer belt 7 and the secondary transfer roller 9. The toner images formed on the intermediary transfer belt 7 are transferred (secondarily-transferred) onto the recording material S nipped and conveyed between the intermediary transfer belt 7 and the secondary transfer roller 9 by the action of the secondary transfer roller 9 in the secondary transfer portion N2. During secondary transfer, to the secondary transfer roller 9, a secondary transfer voltage (secondary transfer bias) which is a DC voltage of an opposite polarity (positive polarity in this embodiment) to the normal charge polarity of the toner is applied from a secondary transfer power source E4 (FIG. 3) as a secondary transfer voltage applying means (applying portion). Incidentally, in this embodiment, the driving roller 71 is electrically grounded (connected to the ground potential). The recording material (transfer (receiving) material, sheet) S such as paper is fed from the feeding device (paper feeding device) 20 as a feeding means and supplied to the secondary transfer portion N2. The feeding device 20 is constituted by including cassettes 12 (first cassette 12A, second cassette 12B), sheet (paper) feeding rollers (pick-up rollers) 13 (first sheet feeding roller 13A, second sheet feeding roller 13B) as feeding members, and conveying roller pairs 14 (first conveying roller pair 14A, second conveying roller pair 14B) as conveying members. The recording material S accommodated in the first cassette 12A is fed from the first cassette 12A by the first sheet feeding roller 13A and is conveyed by the first conveying roller pair 14A, and thus is conveyed to a registration roller pair 16 as a synchronously conveying member. Similarly, the recording material S accommodated in the second cassette 12B is fed from the second cassette 12B by the second sheet feeding roller 13B and is conveyed by the second conveying roller pair 14B, and thus is conveyed to the registration roller pair 16. The recording material S conveyed to the registration roller pair 16 is timed to the toner image on the intermediary transfer belt 7 by the registration roller pair 16 and then is conveyed to the secondary transfer portion N2. As the recording material S, for example, plain paper, a synthetic resin sheet, an envelope, and the like are used, but in this embodiment, the recording material S will be described as plain paper. The first and second cassettes 12A and 12B are provided at a lower portion of an apparatus main assembly 101 of the image forming apparatus 100 so as to be detachably mountable to the apparatus main assembly 101. The recording materials S accommodated in the first and second cassettes 12A and 12B are fed one by one selectively from the first cassette 12A or the second cassette 12B by the first sheet feeding roller 13A or the second sheet feeding roller 13B.

The recording material S on which the toner images are secondarily-transferred is conveyed to the fixing device 10 as a fixing means.

The fixing device 10 includes a fixing film 10*a* as a fixing member (rotatable fixing member) in which a heat source is provided on an inner peripheral surface side and a pressing roller 10*b* as a pressing member (rotatable pressing member). The fixing device 10 heats and presses the recording material S on which the toner image is carried in a fixing portion (fixing nip) which is a contact portion between the fixing film 10*a* and the pressing roller 10*b*, and thus fixes (melts, sticks) the toner image on the recording material S. A temperature of the fixing device 10 is determined on the basis of a detection result of an environmental temperature sensor (not shown) and setting of a kind of the recording material S. In general, when a process speed is the same, the temperature of the fixing device 10 is set to a higher value with a lower environmental temperature and with a larger set basis weight of the recording material S (paper). As the kind of the recording material S, there are, for example, plain paper 1, plain paper 2, and plain paper 3, and for example, basis weights of the plain paper 1, the plain paper 2, and the plain paper 3 are 64 to 75 g/$m^2$, 76 to 90 g/$m^2$, and 91 to 105 g/$m^2$, respectively. Incidentally, as regards each of numerical value ranges, the term “to” between two numerical values means that an associated numerical value range contains the two numerical values before and after the term “to”. Further, the temperatures of the fixing device 10 set for the plain paper 1, the plain paper 2, and the plain paper 3 at the environmental temperature of 23° C. are 190° C., 200° C., and 210° C., respectively. The recording material S on which the toner image is fixed is discharged (output) to a discharge tray 30 provided outside (on an upper surface of) the apparatus main assembly 101 of the image forming apparatus 100 by a sheet (paper) discharging roller pair 11 as a discharge conveying member or the like.

The toner (primary transfer residual toner) remaining on the photosensitive drum 1 after the primary transfer is removed and collected from the photosensitive drum 1 by the drum cleaning device 6 as a photosensitive member cleaning means. The drum cleaning device 6 includes a collecting container 61 for accommodating the toner and a cleaning blade 62 as a cleaning member provided in contact with the photosensitive drum 1. The drum cleaning device 6 scrapes off the primary transfer residual toner from the surface of the rotating photosensitive drum 1 by the cleaning blade 62, and then accommodates the primary transfer residual toner in the collecting container 61.

Further, on the outer peripheral surface side of the intermediary transfer belt 7, in a position opposing the tension roller 74, a belt cleaning device 8 as an intermediary transfer cleaning means is provided. A deposited matter such as toner (secondary transfer residual toner) remaining on the intermediary transfer belt 7 after the secondary transfer is removed and collected from the intermediary transfer belt 7 by the belt cleaning device 8. Details of the belt cleaning device 8 will be described later.

Here, the first and second sheet feeding rollers 13A and 13B are rotated by transmitting thereto a driving force from a sheet feeding motor D3 (FIG. 3) as a driving means. Further, the first and second conveying roller pairs 14A and 14B, the registration roller pair 16, and the sheet discharging roller pair 11 are rotationally driven by transmitting thereto a driving force from a conveying motor D4 (FIG. 3) as a driving means. Further, the image forming apparatus 100 includes sheet (paper) presence/absence sensors 21 (first sheet presence/absence sensor 21A, second sheet presence/absence sensor 21B) as a recording material presence/absence detecting means, sheet (paper) feeding sensors 22 (first sheet feeding sensor 22A, second sheet feeding sensor 22B) as a recording material feeding detecting means, and a sheet (paper) discharge sensor 31 as a recording material discharge detecting means. By the first and second sheet feeding sensors 22A and 22B, whether or not sheet feeding from the first and second cassettes 12A and 12B, respectively, is completed is determined. Further, at timings when the sheet feeding from the first and second cassettes 12A and 12B is completed, by the first and second sheet presence/absence sensors 21A and 21B, the presence/absence of the recording materials S in the first and second cassettes 12A and 12B, respectively, is detected. Further, by the sheet discharge sensor 31, whether or not the recording material S is discharged to an outside of the apparatus main assembly 101 of the image forming apparatus 100 is detected.

Each of the sheet presence/absence sensors 21 (first and second sheet presence/absence sensors 21A and 21B), the sheet feeding sensors 22 (first and second sheet feeding sensors 22A and 22B), and the sheet discharge sensor 31 is constituted by including, for example, an optical sensor provided with a light emitting (projecting) portion and a light receiving portion.

2. Control Constitution

Figure 3:
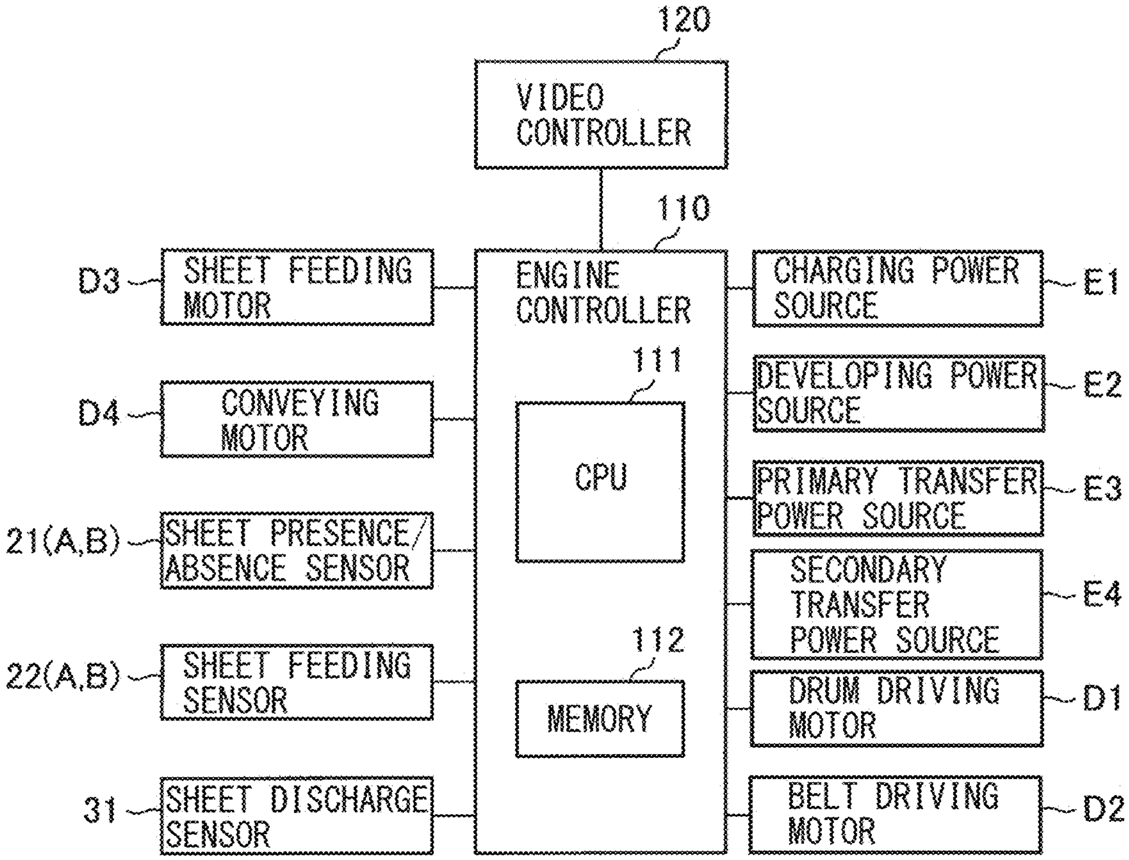
FIG. 3 is a schematic view showing an outline of a control constitution of the image forming apparatus.

FIG. 3 is a block diagram showing an outline of a control constitution of the image forming apparatus in this embodiment. The image forming apparatus 100 includes an engine controller 110 and a video controller 120. The video controller 120 processes an image signal input from an external device (not shown) such as a personal computer and transmits the processed image signal to the engine controller 110. The engine controller 110 carries out control of an operation of the image forming apparatus 100 such as an image forming operation on the basis of the image signal input from the video controller 120.

The engine controller 110 is constituted by including a CPU 111 as a controller (arithmetic processing portion), a memory 112 as a storing portion, and an input/output portion (not shown) for performing input/output of information between the engine controller 110 and an external device. The memory 112 is constituted by storing media such as a ROM and a RAM. In the ROM, a control program such as a program for executing the image forming operation or the like is stored in advance. In the RAM, information input to the engine controller 110, detected information, a calculation result, and the like are stored. To the engine controller 110, respective portions of the image forming apparatus 100 are connected. For example, to the engine controller 110, the charging power source E1, the developing power source E2, the primary transfer power source E3, the secondary transfer power source E4, and the like are connected. Further, to the engine controller 110, various driving portions such as a drum driving motor D1, a belt driving motor D2, a sheet feeding motor D3, a conveying motor D4, and the like are connected. Further, to the engine controller 110, various sensors such as the sheet presence/absence sensors 21 (first and second sheet presence/absence sensors 21A, 21B), the sheet feeding sensors 22 (first and second sheet feeding sensors 22A, 22B), the sheet discharge sensor 31, and the like are connected. Signals showing detection results of the various sensors are input to the engine controller 110. The CPU 111 controls the operations of the respective portions and causes the image forming apparatus 100 to execute various operations such as the image forming operation.

Incidentally, in this embodiment, although illustration is omitted, the charging power source E1, the developing power source E2, and the primary transfer power source E3 are provided independently of the respective image forming portions P. Further, the drum driving motor D1 may be provided independently of the respective photosensitive drums 1 or may be provided commonly to all or a part of the photosensitive drums 1. Further, the sheet feeding motor D3 may be provided independently of the respective sheet feeding rollers 13A and 13B or may be provided commonly to all or a part of the sheet feeding rollers 13A and 13B. Further, the conveying motor D4 may be provided independently of each of the conveying roller pairs 14A and 14B, the registration roller pair 16, and the sheet discharging roller pair 11 or may be provided commonly to all or a part of these roller pairs.

The image forming apparatus 100 executes a job (print job) which is a series of operations for forming and outputting image(s) on a single recording material S or a plurality of recording materials S started by a single start instruction. The job includes an image forming step, a pre-rotation step, a sheet (paper) interval step, and the post-rotation step, in general. The image forming step is a period in which formation (exposure) of an electrostatic latent image for an image to be formed and output on the recording material S, formation of the toner image (development), and transfer of the toner image are actually carried out, and during image formation refers to this period. Specifically, a timing during the image formation is different between positions where the respective steps of the formation of the electrostatic latent image, the toner image formation, and the toner image transfer are performed. The pre-rotation step is a period, from input of a start instruction until the image formation is actually started, in which a preparatory operation before the image forming step is performed. The sheet interval step is a period corresponding to an interval between a recording material S and a subsequent recording material S when formation of the images on the plurality of recording materials S is continuously performed (continuous image formation). The post-rotation step is a period in which a post-operation (preparatory operation) after the image forming step is performed. During non-image formation is a period other than during image formation and includes the periods of the pre-rotation step, the sheet interval step, and the post-rotation step, which are described above, and further includes a period of a pre-multi-rotation step which is a preparatory operation during turning-on of a power source of the image forming apparatus 100 or during restoration from a sleep state.

3. Belt Cleaning Device

Figure 4:
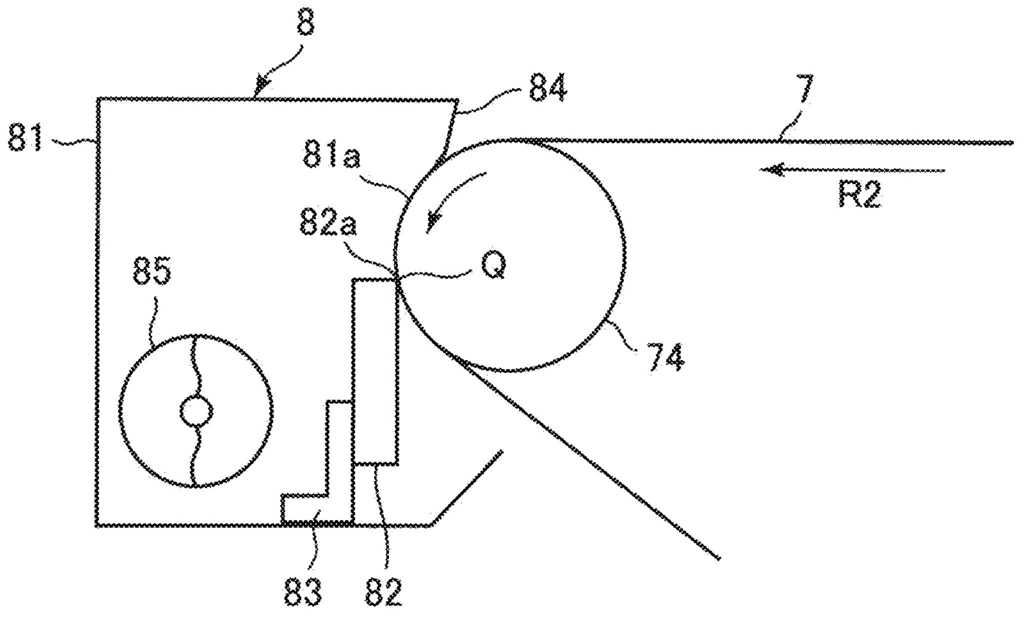
FIG. 4 is a schematic sectional view showing a belt cleaning device.

FIG. 4 is a schematic sectional view showing the belt cleaning device 8 in this embodiment. FIG. 4 shows a cross section substantially perpendicular to a widthwise direction of the intermediary transfer belt 7 (along a direction substantially perpendicular to a surface movement direction of the intermediary transfer belt 7), i.e., substantially perpendicular to a rotational axis direction of the supporting rollers (tension roller 74 and the like) for the intermediary transfer belt 7.

The belt cleaning device 8 is disposed on the outer peripheral surface side of the intermediary transfer belt 7 in a position downstream of the secondary transfer portion N2 and the primary transfer portion N1 (most upstream primary transfer portion N1Y) with respect to a rotational direction of the intermediary transfer belt 7. In this embodiment, the belt cleaning device 8 is disposed opposed to the tension roller 74 through the intermediary transfer belt 7.

The belt cleaning device 8 includes a collecting container (casing) 81 provided with an opening 81*a* on an intermediary transfer belt 7 side. Further, the belt cleaning device 8 includes the cleaning blade 82 as a cleaning member so as to be positioned in the opening 81*a* of the collecting container 81. The cleaning blade 82 is mounted to the collecting container 81 through a supporting member 83.

The cleaning blade 82 is a so-called plate-like member with a predetermined thickness, which has a predetermined length in each of a longitudinal direction substantially parallel to the widthwise direction of the intermediary transfer belt 7 and a widthwise direction (short direction) substantially perpendicular to the longitudinal direction. In this embodiment, the cleaning blade 82 is formed of urethane rubber (polyurethane) as an elastic material. The cleaning blade 82 is fixed to the supporting member 83 at a fixed end portion thereof which is one end portion with respect to the widthwise direction. Further, in this embodiment, the supporting member 83 is fixed to the collecting container 81. Further, the cleaning blade 82 is contacted to the surface of the intermediary transfer belt 7 at an edge portion 82*a* on an outer side (intermediary transfer belt 7 side) of a free end portion side-end which is the other end portion with respect to the widthwise direction. The cleaning blade 82 is contacted to the surface of the intermediary transfer belt 7 so that the free end portion side-end thereof is directed toward an upstream side with respect to the surface movement direction of the intermediary transfer belt 7 during the image formation, i.e., extends in a counter direction to the surface movement direction of the intermediary transfer belt 7. Further, the cleaning blade 82 is pressed toward the tension roller 74 through the intermediary transfer belt 7. A contact portion between the cleaning blade 82 and the intermediary transfer belt 7 is a cleaning nip (cleaning portion) Q. The belt cleaning device 8 scrapes off the deposited matter such as the secondary transfer residual toner from the surface of the rotating intermediary transfer belt 7 by the cleaning blade 82, and then collects the deposited matter in the collecting container 81.

Further, the belt cleaning device 8 includes a scooping sheet 84 so as to be positioned in the opening 81*a* of the collecting container 81 on a side upstream of the cleaning blade 82 with respect to the surface movement direction of the intermediary transfer belt 7. The scooping sheet 84 is mounted to the collecting container 81. The scooping sheet 84 is a sheet-like member, with a predetermined thickness, which has a predetermined length in each of a longitudinal direction substantially parallel to a direction substantially perpendicular to the surface movement direction of the intermediary transfer belt 7, and a widthwise direction (short direction) substantially perpendicular to the longitudinal direction. In this embodiment, the scooping sheet 84 is formed with a plastic sheet having flexibility. The scooping sheet 84 is fixed to the collecting container 81 at a fixing end portion thereof which is one end portion with respect to the widthwise direction thereof. Further, the scooping sheet 84 is contacted to the intermediary transfer belt 7 at a free end portion-side leading end which is the other end portion with respect to the widthwise direction thereof. The scooping sheet 84 is contacted to the intermediary transfer belt 7 so that the free end portion-side leading end is directed toward a downstream side with respect to the surface widthwise direction of the intermediary transfer belt 7 during the image formation. The scooping sheet 84 causes the toner scraped off from the surface of the intermediary transfer belt 7 by the cleaning blade 82 to be dropped into the collecting container 81, and in addition, suppresses back-flow of the toner from the collecting container 81 side toward the intermediary transfer belt 7 side.

Further, the belt cleaning device 8 includes a conveying screw 85 as a toner conveying member in the collecting container 81. The conveying screw 85 conveys the toner collected in the collecting container 81 along the longitudinal direction (widthwise direction of the intermediary transfer belt 7, longitudinal direction of the cleaning blade 82) of the collecting container 81, and discharges the toner through a discharge opening (not shown) provided in the collecting container 81. The toner discharged from the collecting container 81 is conveyed toward a collecting toner box (not shown) provided in the image forming apparatus 100 through a conveying path (not shown) provided in the image forming apparatus 100.

4. Contact Condition of Cleaning Blade

A contact condition of the cleaning blade 82 to the intermediary transfer belt 7 in this embodiment will be described.

In this embodiment, a rubber hardness (JIS-A hardness) of the cleaning blade 82 is set to 65° to 75°. Further, in this embodiment, a set angle θ1 of the cleaning blade 82 is set to 12° to 18°. Further, in this embodiment, a penetration amount (depth) δ of the cleaning blade 82 into the intermediary transfer belt 7 is set to 0.3 mm to 1.2 mm. Further, in this embodiment, by the above-described setting of the rubber hardness, the set angle θ1, and the penetration amount δ, a contact pressure (static pressure) of the cleaning blade 82 to the intermediary transfer belt 7 is set to 18 gf/cm or less, preferably 15 gf/cm or less.

The cleaning blade 82 may have a constitution in which the rubber hardness falls within the above-described range as a whole but may have a constitution in which a portion contacting the intermediary transfer belt 7 has a curved (hardened) layer of which rubber hardness falls within the above-described range. The cured layer may be a layer provided on the surface of the cleaning blade 82, but from a viewpoint of improving durability, the cured layer may also be a layer obtained by subjecting a part of a base material (body) of the cleaning blade 82 to processing. In the case where polyurethane is used as the base material of the cleaning blade 82, the cured layer can be formed in the following manner. That is, a portion of the cleaning blade to be contacted to the intermediary transfer belt 7 is impregnated with an isocianate compound for a certain time. Then, the polyurethane contained in the base material of the cleaning blade 82 is reacted with the isocianate compound, whereby a resultant reaction portion can be formed as the cured layer.

Figure 5:
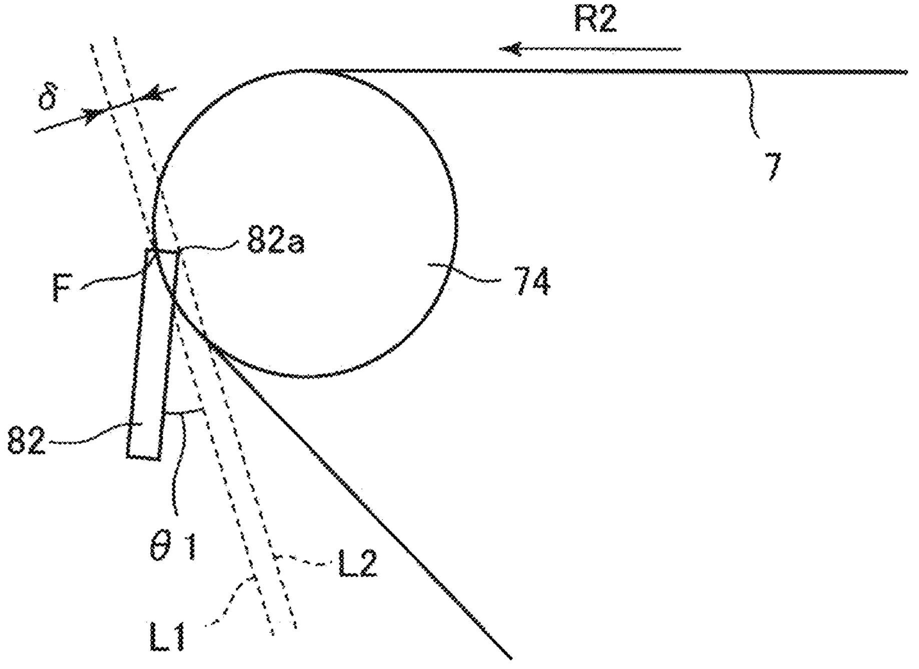
FIG. 5 is a schematic sectional view for illustrating a contact condition of a cleaning blade.

Further, the set angle θ1 and the penetration amount δ are defined in the following manner. FIG. 5 is a schematic sectional view of a neighborhood of the cleaning blade 82 when it is assumed that the cleaning blade 82 enters the intermediary transfer belt 7 (tension roller 74) as it is without being deformed in a leading end portion thereof. FIG. 5 shows a cross section substantially perpendicular to the widthwise direction (longitudinal direction of the cleaning blade 82) of the intermediary transfer belt 7. In FIG. 5, a point where a leading end surface of the cleaning blade 82 and the intermediary transfer belt 7 intersect each other is an intersection point F. Further, a tangential line of the intermediary transfer belt 7 at the intersection point F is a tangential line L1. At this time, an angle formed between the tangential line L1 and a surface of the cleaning blade 82 opposing (facing) the intermediary transfer belt 7 is defined as the set angle θ1. Further, in FIG. 5, a rectilinear line parallel to the tangential line L1 and passing through an edge portion 82*a* of a leading end of the cleaning blade 82 is a rectilinear line L2. At this time, a distance (shortest distance) between the tangential line L1 and the rectilinear line L2, i.e., a distance from the tangential line L1 to the edge portion

82*a* of the leading end of a free end portion 31*e* of the cleaning blade 82 is defined as the penetration amount δ.

Further, the cleaning blade 82 is contacted to an opposing member under a desired condition of the set angle θ1 and the penetration amount δ, and a pressure under which the opposing member is pressed by the cleaning blade 82 is measured by a pressure sensor (for example, manufactured by MISUMI Corp.), and a measured value is a contact pressure (static pressure). This contact pressure (static pressure) of the cleaning blade 82 to the intermediary transfer belt 7 is represented by a contact load (gf) per unit length (cm) of the cleaning blade 82 in the longitudinal direction.

In this embodiment, in a constitution (fixed system) in which the cleaning blade 82 is fixed, by the contact condition described above, the contact pressure (static pressure) of the cleaning blade 82 to the intermediary transfer belt 7 is set relatively low. By this, a coefficient of kinetic friction in the contact portion between the cleaning blade 82 and the intermediary transfer belt 7 becomes large, so that blade squeaking (occurrence of noise) does not readily occur in the case where a frictional force between the cleaning blade 82 and the intermediary transfer belt 7 becomes large or in the like case. The coefficient of kinetic friction in the contact portion between the cleaning blade 82 and the intermediary transfer belt 7 becomes large in some instances due to that image formation with a low print ratio is continued and that a cumulative use amount of the intermediary transfer belt 7 is increased, or the like.

However, when such a constitution is employed, slipping-through of the toner of an untransferred toner image in the case where automatic feeding portion switching (described later) is performed becomes liable to occur. That is, in the fixed system, in the case where the contact pressure (static pressure) is set to 18 gf/cm or less, when the coefficient of kinetic friction in the control portion between the cleaning blade 82 and the intermediary transfer belt 7 is lowered by presence of the untransferred toner image or the like, a sufficient dynamic pressure is not readily ensured. By this, the slipping-through of the toner of the untransferred toner image becomes liable to occur. Here, the dynamic pressure refers to a pressure applied to the intermediary transfer belt 7 by the cleaning blade 82 when the surface of the intermediary transfer belt 7 is moved. As specifically described later, by a frictional force during movement of the surface of the intermediary transfer belt 7, the leading end portion of the cleaning blade 82 is deformed so as to be caught in a surface movement direction of the intermediary transfer belt 7. The dynamic pressure is a pressure exerted on the leading end portion of the cleaning blade when this deformation occurs. When the coefficient of kinetic friction in the contact portion between the cleaning blade 82 and the intermediary transfer belt 7 becomes large, the frictional force also becomes large, and therefore, deformation of the leading end portion of the cleaning blade 82 becomes large, so that the dynamic pressure also increases.

5. Developer

In this embodiment, the developing device 4 develops the electrostatic latent image on the photosensitive drum 1 with the two-component developer obtained by mixing the carrier (magnetic carrier particles) and the toner (non-magnetic toner particles) as the developer. In this embodiment, the developer obtained by mixing the carrier and the toner in a weight ratio of 91:9 (toner concentration: 9%) was used. Further, in this embodiment, a total weight of an initial developer accommodated in the developing device 4 was 208 g.

In this embodiment, as the carrier, a carrier obtained by coating ferrite particles with silicone resin was used. In this embodiment, saturated magnetization of the carrier in an applied magnetic field of 240 [kA/m] is 24 [$Am^2/kg$]. Further, a specific resistance of the carrier in electric field strength of 3,000 [V/cm] is $1\times10^7$ [Ω·cm] to $1\times10^8$ [Ω·cm].

Further, in this embodiment, a weight-average particle size of the carrier is 50 μm.

The toner is constituted by a material containing at least a binder resin, a colorant, and a charge control agent. In this embodiment, as the binder resin styrene-acrylic resin was used. However, as the binder resin, it is also possible to use a resin such as styrene-based resin, polyester-based resin, or polyethylene resin. As the colorant, various pigments, various dyes, and the like may be used singly or combination of a plurality of kinds thereof. As the charge control agent, as desired, a charge control agent containing an electrification control agent for strengthening electric charge control may be used. As the electrification control agent for strengthening electric charge control, a nigrosine-based dye, a triphenylmethane-based dye, or the like can be utilized.

Further, the toner may contain a wax. The wax is contained for the purpose of improving a parting gravity from the fixing member during the fixing and a fixing property during the fixing. As the wax, it is possible to use paraffin wax, carnauba wax, polyolefin, and the like. The wax is used in a state in which the wax is kneaded and dispersed in the binder resin. In this embodiment, as a material of the toner, toner obtained by pulverizing a resin, by a mechanical pulverizing machine, and obtained by kneading and dispersing the binder resin, the colorant, the charge control agent, and the wax can be used. A melting point of the wax used in this embodiment is 100° C. or less.

Further, to the toner, an external additive is externally added. As the external additive, it is possible to use amorphous silica subjected to hydrophobization, titanium oxide, titanium compound, and the like. As a typical example of the external additive, inorganic oxide-fine particles is cited. By adding the external additive to the toner, flowability and a charge amount of the toner can be adjusted. A particle size (average particle size) of the external additive may preferably be 1 nm or more and 100 nm or less. In this embodiment, as the external additive, titanium oxide of 50 nm in average particle size, amorphous silica of 2 nm in average particle size, and amorphous silica of 100 nm in average particle size were added to toner base particles. Addition amounts (weight ratios) of the external additives to the toner base particles are such that the titanium oxide of 50 nm is 0.5 wt. %, the amorphous silica of 2 nm is 0.5 wt. %, and the amorphous silica of 100 nm is 1.0 wt. %.

The thus-prepared toner was 6.6 μm in weight-average particle size as measured by a power particle size image analyzer ("FPIA-3000", manufactured by Sysmex Corp.).

6. Operation when Sheet Absence is Detected in Comparison Example

Next, an operation in the case where sheet (paper) absence is detected during continuous image formation in a comparison example will be described. Incidentally, as to an image forming apparatus of the comparison example, basic constitution and operation are substantially same as those of the image forming apparatus 100 of this embodiment except with regard to a timing when the image formation is resumed in the case where the automatic feeding portion switching is performed. Further, also as regards elements having identical or corresponding functions or constitutions as those of the image forming apparatus of this embodiment, such will be described by adding the same reference numerals or symbols.

The image forming apparatuses 100 of this embodiment and the comparison example are each provided with an automatic feeding portion switching function and constituted so that the image formation is started in advance of a feeding operation of recording materials S. In each of the image forming apparatuses 100 of this embodiment and the comparison example, a constitution in which the intermediary transfer belt 7 and the secondary transfer roller 9 cannot be separated from each other is employed.

Figure 6:
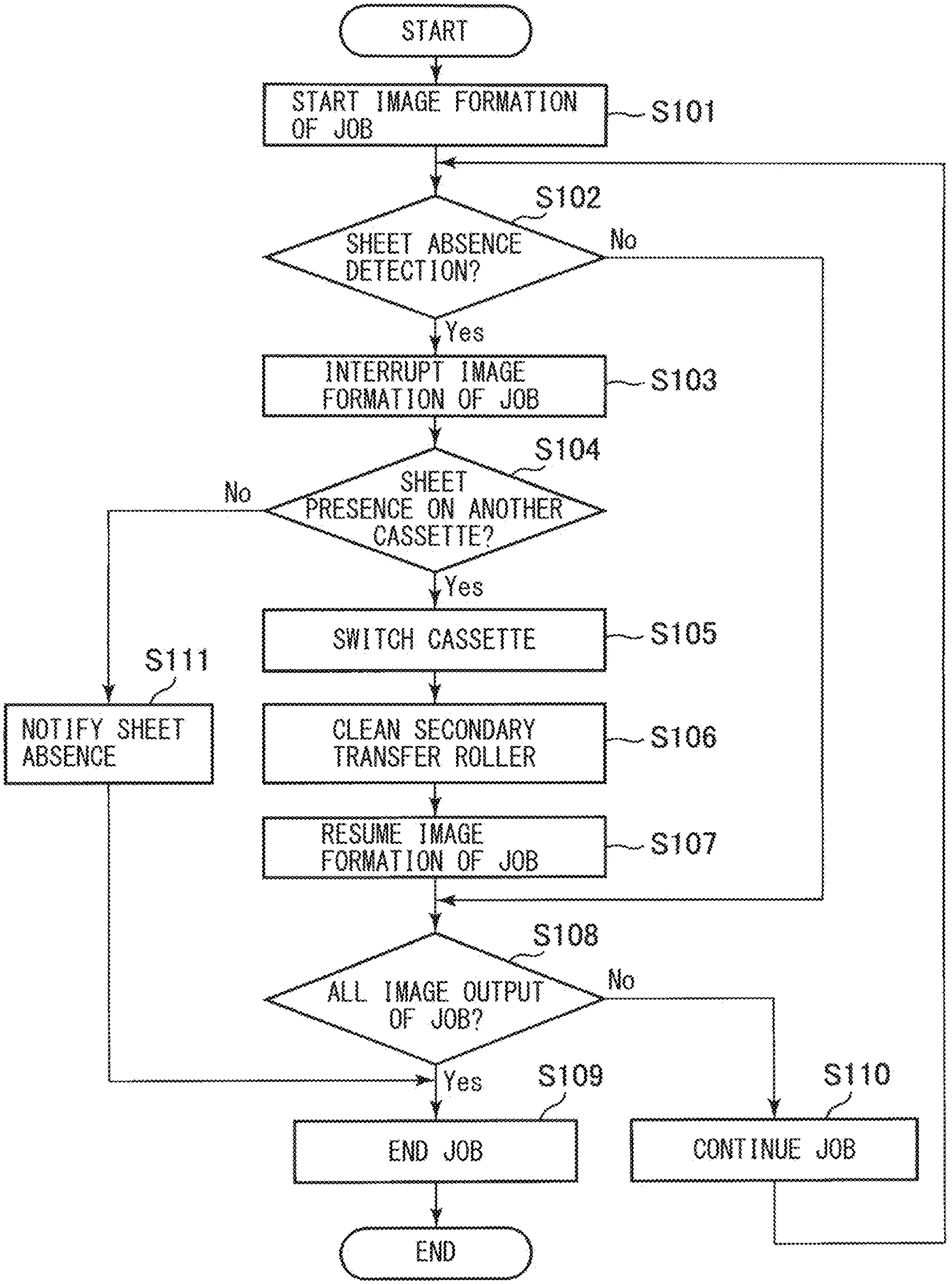
FIG. 6 is a flowchart for illustrating an outline of control in a comparison example.

FIG. 6 is a flowchart for illustrating the operation in the case where the sheet absence is detected during the continuous image formation in the comparison example. In FIG. 6, an overall flow of the operation in the case where the image forming apparatus 100 executes a continuous image forming job will be described. Details of a timing when the automatic feeding portion switching is performed will be described later.

When information on the job is input from the external device to the image forming apparatus 100, the CPU 111 causes the image forming apparatus 100 to start the image formation (S101). In the information on the job, information on an operation setting such as information for designating a kind (cassette 12 in which recording materials S of a predetermined kind are accommodated) of the recording materials S, and an image signal are included. The CPU 111 carries out control so that for each of pages, the image formation is started prior to a feeding operation of the recording material S from the cassette 12. Then, the CPU 111 discriminates whether or not the sheet absence was detected on the basis of a detection result of the sheet presence/absence sensor 21 for every toner image when completion of sheet feeding of a single recording material S is detected by the sheet feeding sensor 22 (S102). For example, in the case where the recording material S is fed from the first cassette 12A, for every toner image when the completion of the sheet feeding is detected by the first sheet feeding sensor 22A, whether or not the sheet absence is detected for the first cassette 12A is discriminated by the first sheet presence/absence sensor 21A. Incidentally, for example, it is possible to discriminate that the sheet feeding is completed in the case where passing of a trailing end of the recording material S with respect to the conveying direction of the recording material S is detected after passing of a leading end of the recording material S with respect to the conveying direction is detected.

In the case where the CPU 111 discriminated in S102 that the sheet absence is detected, the CPU 111 causes the image forming apparatus 100 to interrupt the image formation of the job (S103). Then, the CPU 111 discriminates whether or not the recording material S is present on another cassette 12 in which the recording material S of the kind designated in the job is accommodated (S104).

For example, in the case where the recording materials S of the same kind are accommodated in the first and second cassettes 12A and 12B and the sheet absence is detected for the first cassette 12A, whether or not the recording material S is present in the second cassette 12B is detected by the second sheet presence/absence sensor 21B. In other words, for example, in the case where the recording material S is fed from the first cassette 12A and then the sheet absence is detected for the first cassette 12A, whether or not another cassette in which the recording material S of the same kind is accommodated is detected.

In the case where the CPU 111 discriminated in S104 that the recording material S is present in another cassette 12, the CPU 111 carries out control so as to switch the cassette 12 as a feeding source of the recording material S to the other cassette 12 (S105). Here, when the sheet absence is detected in S102, formation of the image on a subsequent recording material S has already been started. For that reason, due to the image formation having already been started when the sheet absence is detected in S102, the toner image transferred on the intermediary transfer belt 7 reaches the secondary transfer portion N2 before the recording material S reaches the secondary transfer portion N2. In this secondary transfer portion N2, a part of the toner of the toner image (untransferred toner image) which is not transferred onto the recording material S is deposited on the surface of the secondary transfer roller 9, whereby the secondary transfer roller 9 is contaminated with the toner. This contamination of the secondary transfer roller 9 causes back (surface) contamination of the recording material S in subsequent image formation. Therefore, the CPU 111 carries out control so as to clean the secondary transfer roller 9 (S106). In this embodiment, the CPU 111 forms an electric field for cleaning the secondary transfer roller 9 in the secondary transfer portion N2. For example, the CPU 111 carries out control so that a voltage of an opposite polarity (i.e., negative polarity which is the same polarity as the normal charge polarity of the toner) to the polarity during the secondary transfer (herein, this voltage is also referred to as a "cleaning voltage" ("voltage for cleaning") is applied to the secondary transfer roller 9. Thus, by applying the cleaning voltage to the secondary transfer roller 9, the toner deposited on the secondary transfer roller 9 can be moved (returned) to the intermediary transfer belt 7. The toner of the untransferred toner image on the intermediary transfer belt 7 and the toner moved from the secondary transfer roller 9 to the intermediary transfer belt 7 by the cleaning of the secondary transfer roller 9 are removed and collected from the surface of the intermediary transfer belt 7 by the belt cleaning device 8.

Then, the CPU 111 causes the image forming apparatus 100 to resume the image formation of the job from the same page for the untransferred toner image (S107). Then, the CPU 111 discriminates whether or not all the images in the job are completely output (S108), and ends the job in the case where all the images are completely output (S109). In the case where all the images are not completely output, the CPU 111 causes the job to continue (S110) and causes processing to return to S102.

Further, in the case where the CPU 111 discriminated in S102 that the sheet absence is not detected, the CPU 111 causes the processing to go to S108. Further, in the case where the CPU 111 discriminated in S104 that the recording material S is absent in another cassette 12, the CPU 111 carries out control so that notification to the effect that the recording material S is absent is provided in a display portion provided in the image forming apparatus 100 or in a display portion of the external device, or in the like portion (S111), and then ends (interrupts) the job (S109).

Figure 7:
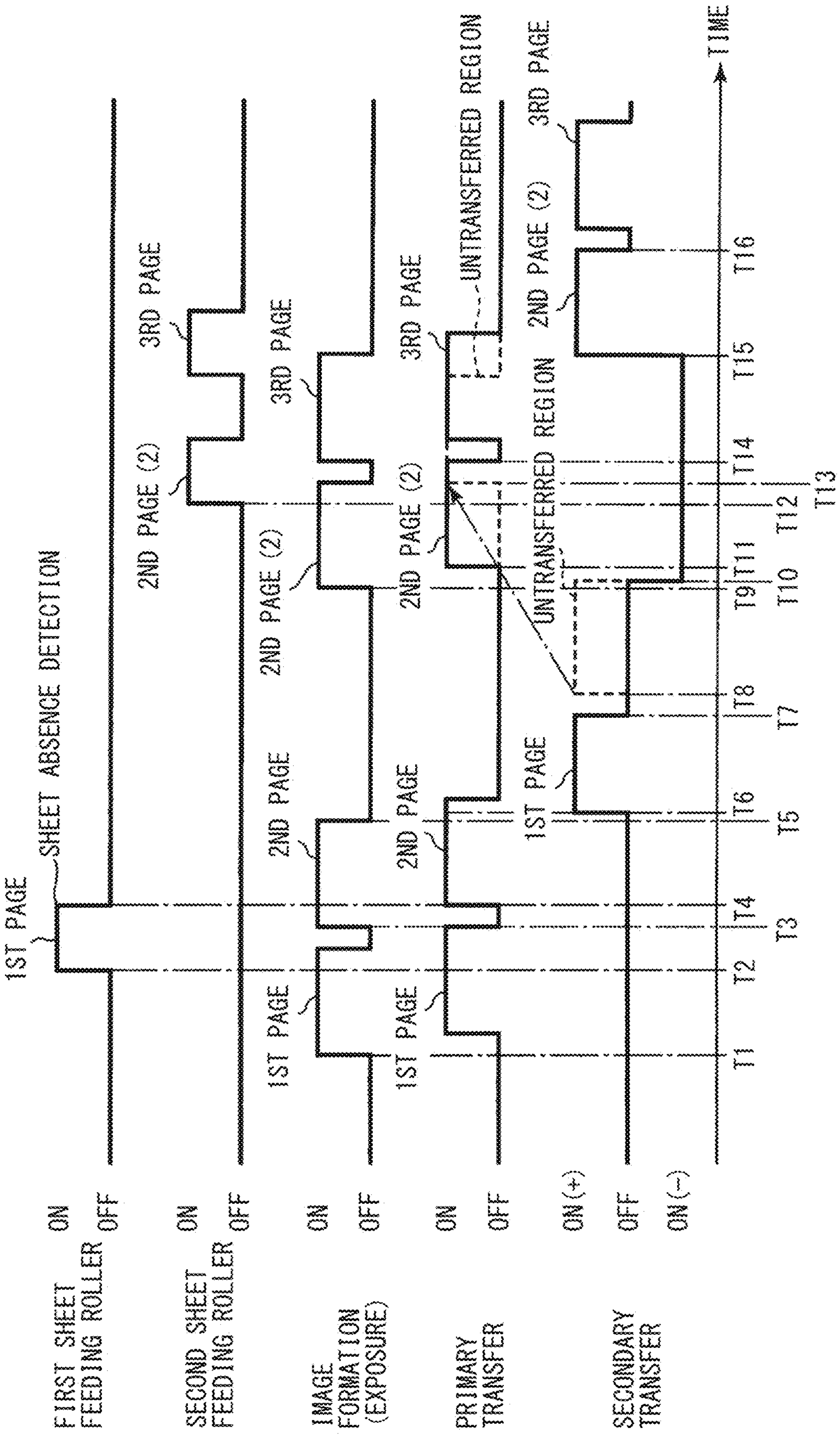
FIG. 7 is a timing chart for illustrating an example of an operation in the comparison example.

FIG. 7 is a timing chart for illustrating an example of an operation in the case where the sheet absence is detected during the continuous image formation in the comparison example. FIG. 7 is an example of the case where a single recording material S is accommodated in the first cassette 12A and a plurality of recording materials S of the same kind as the kind of the recording material S in the first cassette 12A are accommodated in the second cassette 12B and where the recording materials S are fed first from the first cassette 12A and images of 3 pages are printed on the recording materials S by one-side printing. In FIG. 7, time progression of a drive timing of each of the first and second sheet feeding rollers 13A and 13B, an image formation (exposure) timing, a voltage application timing of the primary transfer portion and a voltage application timing (and polarity) of the secondary transfer portion are schematically shown. Operations of the respective portions in accordance with this timing chart are controlled by the CPU 111. In this case, the image of each page is formed with the toner of at least one color in a substantially whole area of an image forming region (toner image formable region). Incidentally, as regards the toner image and the image forming region, a leading end and a trailing end refer to a leading end and a trailing end, respectively, thereof with respect to the recording material conveying direction (surface movement directions of the photosensitive drum 1 and the intermediary transfer belt 7). Further, the image forming region where the untransferred toner image on the intermediary transfer belt 7 is capable of being carried is referred to as an "untransferred toner image region".

First, image formation (exposure) for a first page is started (T1). After the image formation for the first page is started, the first sheet feeding roller 13A is driven and thus sheet feeding of a first recording material S from the first cassette 12A is started (T2). When the sheet feeding of the first recording material S is completed, the sheet absence is detected by the first sheet presence/absence sensor 21A (T4). However, in advance of this detection, image formation for a second page has already been started (T3). The toner image of the first page is primarily transferred onto the intermediary transfer belt 7, and then is secondarily transferred onto the first recording material S (T6, T7). On the other hand, the toner image of a second page is primarily transferred onto the intermediary transfer belt 7 and then reaches the secondary transfer portion N2, but the recording material S is not conveyed to the secondary transfer portion N2 at this time. For that reason, this toner image (untransferred toner image) passes through the secondary transfer portion N2 while being carried on the intermediary transfer belt 7 without being secondarily transferred onto the recording material S. In this example, when the untransferred toner image region passes through the secondary transfer portion N2, a voltage applied to the secondary transfer roller 9 is turned off so that the toner of the untransferred toner image is not deposited on the secondary transfer roller 9 in an amount as small as possible (OFF) (OV) (T8 to T10). Thereafter, cleaning of the secondary transfer roller 9 is executed (T10 to T15).

Specifically, a cleaning voltage (for example, −300 V) of the same polarity as the normal charge polarity of the toner is applied to the secondary transfer roller 9.

On the other hand, the image formation (exposure) for the second page is ended (T5), and thereafter, the image formation in the job is interrupted. Then, after the image forming apparatus 100 waits for a predetermined time corresponding to a time taken for cleaning the secondary transfer roller 9, re-image formation for the same second page as the untransferred toner image is started (T9). Further, after this re-image formation for the second page is started, the second sheet feeding roller 13B is driven and sheet feeding of the recording material S (a first sheet after the switching, i.e., a second sheet in the job) from the second cassette 12B is started (T12). The toner image of the second page by the re-image formation is primarily transferred onto the intermediary transfer belt 7 (T11 to T14), and thereafter is secondarily transferred onto the recording material S (T15, T16). Thus, in the case where the automatic feeding portion switching is performed, a period from passing of the recording material S before the switching through the secondary transfer portion N2 until the recording material S after the switching reaches the secondary transfer portion N2 becomes longer than a normal sheet interval. That is, in the case where the automatic feeding portion switching is performed, a surface movement distance of the intermediary transfer belt 7 from the passing of the recording material S before the switching through the secondary transfer portion N2 until the recording material S after the switching reaches the secondary transfer portion N2 becomes longer than the normal sheet interval.

Incidentally, in the second cassette 12B, the plurality of recording materials S are accommodated, and therefore, the toner image of a three page is secondarily transferred with the normal sheet interval onto the recording material S conveyed from the second cassette 12B.

Here, in the comparison example, in the case where the automatic feeding portion switching is performed, in order to resume the image formation as early as possible, the image formation is resumed so as to execute the secondary transfer immediately after an end of the cleaning of the secondary transfer roller 9. For that reason, a leading end of the untransferred toner image on the intermediary transfer belt 7 passing through the secondary transfer portion N2 overlaps with an image forming region, before the leading end subsequently reaches the secondary transfer portion N2, in which the toner image after the resumption is capable of being primarily transferred. That is, before the leading end of the untransferred toner image on the intermediary transfer belt 7 passed through the secondary transfer portion N2 subsequently reaches the secondary transfer portion N2, the leading end is capable of overlapping with the image forming region in which the toner image after the resumption of the image formation is capable of being primarily transferred. In the example of FIG. 7, the leading end of the untransferred toner image region on the intermediary transfer belt 7 passed through the secondary transfer portion N2 overlaps with the image forming region in which the toner image of the first page (second page in the job) after resumption of the image formation is capable of being primarily transferred, before the leading end subsequently reaches the secondary transfer portion N2. In other words, before the untransferred toner image on the intermediary transfer belt 7 passed through the secondary transfer portion N2 subsequently reaches the secondary transfer portion N2, the image formation is resumed so that the image forming region on the intermediary transfer belt 7 after the resumption of the image formation reaches the secondary transfer portion N2. Incidentally, depending on a time taken for cleaning the secondary transfer roller 9 or the like toner image, in some instances, the leading end of the untransferred toner image on the intermediary transfer belt 7 overlaps with the image forming region in which toner images of the second page and later after the resumption of the image formation is capable of being primarily transferred.

7. Slipping-Through of Toner of Untransferred Toner Image

Figure 8:
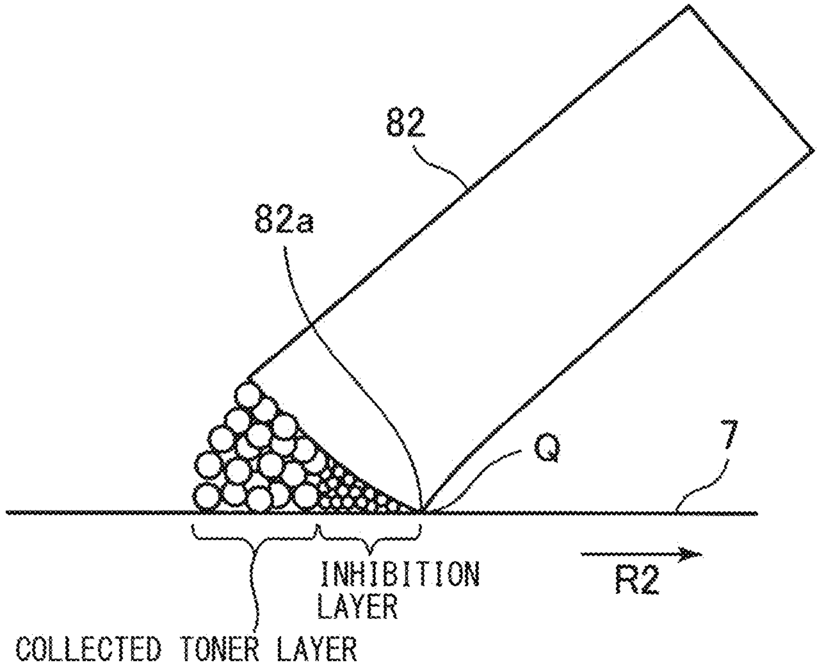
FIG. 8 is a schematic view for illustrating slipping-through of toner.

Next, slipping-through of the toner of the untransferred toner image will be described. FIG. 8 is a schematic sectional view of a neighborhood of a cleaning nip Q. FIG. 8 shows a cross section substantially perpendicular to the widthwise direction (longitudinal direction of the cleaning blade 82) of the intermediary transfer belt 7.

The untransferred toner image on the intermediary transfer belt 7 generated by the automatic feeding portion switching is conveyed by the intermediary transfer belt 7 and is removed by the cleaning blade 82 of the belt cleaning device 8. The untransferred toner image is not transferred onto the recording material S, and therefore, a toner application amount (toner weight per unit area) thereof on the intermediary transfer belt 7 is large compared with normal secondary transfer residual toner. Thus, when the untransferred toner image large in toner application amount on the intermediary transfer belt 7 enters the cleaning nip Q, there is a possibility that the slipping through of the toner occurs.

As shown in FIG. 8, the cleaning blade 82 is contacted to the surface of the intermediary transfer belt 7 so as to extend in a counter direction to the surface movement direction of the intermediary transfer belt 7. Further, the cleaning blade 82 is pressed toward the tension roller 74 through the intermediary transfer belt 7. When the surface of the intermediary transfer belt 7 is moved, the edge portion 82*a* of the leading end of the cleaning blade 82 is deformed so as to be caught in the surface movement direction of the intermediary transfer belt by a frictional force between the cleaning blade 82 and the intermediary transfer belt 7. Then, in the neighborhood (between the leading end surface of the cleaning blade 82 and the surface of the intermediary transfer belt 7) of the edge portion 82*a* of the leading end of the cleaning blade 82, an external additive stagnation portion where the external additive added to the toner stagnates (hereinafter, this portion is also referred to as an "inhibition layer") is formed. This inhibition layer suppresses that the toner (collected toner) on the intermediary transfer belt 7 enters the cleaning nip Q. Thus, by a pressing force of the cleaning blade 82 against the surface of the intermediary transfer belt 7 and the formation of the inhibition layer, the collected toner is prevented from entering the cleaning nip Q.

By this, the collected toner is scraped off from the surface of the intermediary transfer belt 7 by the cleaning blade 82, so that it is possible to clean the surface of the intermediary transfer belt 7.

However, as in the case of the untransferred toner image, in the case where the toner application amount of the untransferred toner image is large and the toner containing toner high in flowability in a large amount is conveyed toward the cleaning nip Q, the slipping-through of the toner occurs in some cases. This is due to that when the toner high in flowability is conveyed, the toner blocked by the inhibition layer is circulated and thus the cleaning blade 82 is pushed up by the toner and that the inhibition layer is broken by the toner, or the like. At this time, in each of positions of the cleaning blade 82 with respect to the longitudinal direction, when the leading end of the untransferred toner image enters the cleaning nip Q, a behavior such that the toner pushes up the cleaning blade 82 and causes the slipping-through thereof is exhibited. Further, when the untransferred toner image corresponds to one page, in each of the positions of the cleaning blade 82 with respect to the longitudinal direction, after the leading end of the untransferred toner image passes through the cleaning nip Q, the cleaning nip Q is stabilized, so that the slipping-through of the toner does not readily occur.

As described above, in the comparison example, in the case where the automatic feeding portion switching is performed, the leading end of the untransferred toner image region on the intermediary transfer belt 7 overlaps with the image forming region where the toner image after the resumption of the image formation is capable of being primarily transferred. That is, the leading end of the untransferred toner image on the intermediary transfer belt 7 is capable of overlapping with the image forming region where the toner image after the resumption of the image formation is capable of being primarily transferred. For that reason, in the comparison example, an image defect (slipping-through image) due to that the toner of the untransferred toner image slipped through the cleaning blade 82 is transferred onto the recording material S after the switching of the automatic feeding portion is liable to occur. The toner of the leading end of the untransferred toner image easy to slip through the cleaning blade 82 is capable of being transferred onto the recording material R together with the toner image after the resumption of the image formation.

8. Outline of Control of this Embodiment

Therefore, in this embodiment, a timing when the image formation in the case where the automatic feeding portion switching is performed is set in the following manner. A position of the leading end of the untransferred toner image on the intermediary transfer belt 7 is defined as an "untransferred toner image leading end". Further, a position of the leading end of the image forming region on the photosensitive drum 1 on which a first toner image after the resumption of the image formation is capable of being formed is defined as a "post-resumption image leading end". At this time, the image formation is resumed so that the post-resumption image leading end first reaches the primary transfer portion N1 after the untransferred toner image leading end first passes through the primary transfer portion N1. That is, a timing when a position of the belt on which the untransferred toner image leading end is transferred passes through the cleaning nip Q and then first passes through the primary transfer portion N1 is defined as a first timing. At this time, the image formation is resumed so that a timing when the post-resumption image leading end first reaches the primary transfer portion N1 becomes a second timing later than the first timing. Further, in this embodiment, a timing when a position of the belt on which the untransferred toner image leading end is transferred passes through the cleaning nip Q and then passes through the primary transfer portion N1 two times is defined as a third timing, the image formation is resumed so that the second timing becomes earlier than the third timing. In this embodiment, in the case where the image is formed on at least an A4-size recording material (in the case where conveyance is made so that a long side of the A4-size recording material becomes a leading end thereof with respect to the recording material conveying direction), the image formation is resumed so as to satisfy the above-described relationship. Incidentally, in a plurality of primary transfer portions N1, the toner images are primarily transferred so as to overlap with each other in the same image forming region on the intermediary transfer belt 7, so that in the case where the above-described relationship holds in either one of the primary transfer portions N1, the above-described relationship also holds true for other primary transfer portions N1. In other words, the image formation is resumed so that an image forming region on the intermediary transfer belt 7 corresponding to the post-resumption image leading end reaches the secondary transfer portion N2 after the untransferred toner image leading end passed through the secondary transfer portion N2 subsequently reaches the secondary transfer portion N2. That is, after the untransferred toner image leading end passes through the secondary transfer portion N2 and then the intermediary transfer belt 7 moves through one full circumference, the image forming region on the intermediary transfer belt 7 on which a first toner image after the resumption of the image formation is capable of being primarily transferred reaches the secondary transfer portion N2. Further, in this embodiment, before the untransferred toner image passes through the secondary transfer portion N2 and then the intermediary transfer belt 8 moves through two full circumferences, the image forming region on the intermediary transfer belt 7 on which the first toner image after the resumption of the image formation is capable of being primarily transferred reaches the secondary transfer portion N2.

Here, the "untransferred toner image leading end" will be further described. Regions obtained by dividing an untransferred toner image region on the intermediary transfer belt 7 for each predetermined unit thereof with respect to the longitudinal direction (widthwise direction of the intermediary transfer belt 7) of the cleaning blade 82 are defined as "divided regions". This predetermined unit is typically one pixel, but is not limited thereto. For example, the untransferred toner image region may be divided into an arbitrary number of regions, for example, 2 to 50 regions (typically, 5 to 20 regions) for each predetermined length (which may be plural pixels) with respect to the longitudinal direction (widthwise direction of the intermediary transfer belt 7) of the cleaning blade 82. At this time, of leading ends of a toner image in the respective divided regions, a toner image leading end in at least one divided region can be defined as the "untransferred toner image leading end". Thus, of the leading ends of the toner image in the respective divided regions, the toner image leading end in at least one divided region is defined as the "untransferred toner image leading end" and then a timing of the resumption of the image formation is set, so that occurrence of the slipping-through image can be suppressed compared with the comparison example. Further, of the toner image leading ends in the respective divided regions, a toner image leading end on a most downstream side may preferably be used as the "untransferred toner image leading end".

Thus, by setting the timing of the resumption of the image formation by using, as the "untransferred toner image leading end", the toner image leading end finally reaching the cleaning nip Q of the leading ends of the toner images in the respective divided regions, the occurrence of the slipping-through image can be effectively suppressed. This is because, as described above, when the untransferred toner image leading end enters the cleaning nip Q in each position with respect to the longitudinal direction of the cleaning blade 82, the toner exhibits a behavior such that the toner pushes up the cleaning blade 82 and causes the occurrence of the slipping-through of the toner.

Parts (a) and (b) of FIG. 9 are schematic views of an untransferred toner image region on the intermediary transfer belt 7 and an untransferred toner image formed in the untransferred toner image region. In an example of these figures, the untransferred toner image region is divided into 12 divided regions with respect to the longitudinal direction of the cleaning blade 82. Positions of the divided regions are represented by H1 to H12. Further, a position of the toner image in the divided regions is represented by positions of 15 divided regions with respect to the conveying direction of the intermediary transfer belt 7. These positions of the 15 divided regions with respect to the conveying direction of the intermediary transfer belt 7 are represented by V1 to V15. In parts (a) and (b) of FIG. 9, black-filled sections (dots) show positions (printed portion, image portion) where the toner image is formed. For example, as shown in part (a) of FIG. 9, in the case where the toner image is formed in a whole area of the untransferred toner image region, in either of the divided regions H1 to H12, the toner image leading end position is V1. In this case, the position of the untransferred toner image leading end is the position of V1 not only in the case where the toner image leading end in at least one of the divided regions is the "untransferred toner image leading end" but also in the case where the toner image leading end on the most downstream side is the "untransferred toner image leading end". Further, for example, as shown in part (b) of FIG. 9, in the case where a character "A" is formed in the untransferred toner image region, the toner image is formed in the divided regions H2 to H11, and there are divided regions different in position of the toner image leading end. For example, in the divided regions H6 and H7, the position of the toner image leading end is V3, and in which divided regions H2 and H11, the position of the toner image leading end is V11. In this case, in the case where the toner image leading end in at least one of the divided regions is the "untransferred toner image leading end" as described above, either one of the positions of V3, V5, V7, V9, and V11 can be determined as the untransferred toner image leading end. On the other hand, in the case where the toner image leading end on the most downstream side is the "untransferred toner image leading end", the untransferred toner image leading end is in the position of V3.

Incidentally, in the example of parts (a) and (b) of FIG. 9, the untransferred toner image region is divided into the 12 divided regions with respect to the longitudinal direction of the cleaning blade 82 and into the 15 divided regions with respect to the recording material conveying direction of the intermediary transfer belt 7, but this example is a schematic example. The number of divisions with respect to both the longitudinal direction and the conveying direction can be arbitrarily selected. For example, when an image of 300 dpi is formed, 300 dots are arranged per (one) inch. In this case, the untransferred toner image leading end can be acquired on the basis of toner image leading ends of divided regions obtained by dividing the untransferred toner image region into about 25,000 divided regions (short edge feeding of LTR-size sheet (paper) or A4-size sheet (paper)) with respect to the longitudinal direction of the cleaning blade 82. On the other hand, from a viewpoint of suppression of a use amount of a memory and a load of computation, the untransferred toner image leading end may be acquired on the basis of the toner image leading ends in divided regions obtained by dividing the untransferred toner image region into several divided regions (for example, 2 to 5 divided regions) with respect to the longitudinal direction of the cleaning blade 82. For example, the untransferred toner image leading end can be acquired on the basis of 3 divided regions on one end portion side, a central portion side, and the other end portion side. The image defect such as the slipping-through image becomes conspicuous in some instances when a size thereof becomes a certain size or more. For example, a length (width) of the cleaning blade 82 in the longitudinal direction can be divided so that a width of each of the divided regions with respect to the longitudinal direction of the cleaning blade 82 becomes about 5 mm or more and about 50 mm or less, typically about 10 mm or more and about 30 mm or less.

However, as a typical example, in the case where continuous image formation in which images are formed with toner of at least one color in a substantially whole area of the image forming region and in which the automatic feeding portion switching is performed, by checking a timing when the image formation is resumed, execution or non-execution of the control in accordance with this embodiment can be discriminated.

Further, in the case where the automatic feeding portion switching is performed, from a viewpoint of resuming the image formation as early as possible, the timing of resumption of the image formation may preferably be set in the following manner. That is, the image formation may preferably be resumed so that the post-resumption image leading end first reaches the primary transfer portion N1 before the untransferred toner image leading end first passed through the primary transfer portion N1 subsequently reaches the secondary transfer portion N2. At this time, the post-resumption image leading end may more preferably first reach the primary transfer portion N1 before the trailing end of the untransferred toner image region first reaches the primary transfer portion N1. However, depending on the position of the untransferred toner image leading end or the like, the post-resumption image leading end may be made to reach the primary transfer portion N1 after the trailing end of the untransferred toner image region passes through the primary transfer portion N1.

9. Details of Control in this Embodiment

FIG. 10 is a flowchart for illustrating an outline of an operation in the case where the sheet absence is detected during the continuous image formation in this embodiment. Here, an overall flow of the operation in the case where the image forming apparatus 100 executes a job of the continuous image formation will be described. Details of the timing of the resumption of the image formation and the like in the case where the automatic feeding portion switching is performed will be described later.

Processes S201 to S206 of FIG. 10 are similar to the processes S101 to S106 of FIG. 6, respectively. Further, processes S208 to S212 of FIG. 10 are similar to the processes S107 to S111 of FIG. 6, respectively. The processes in FIG. 10 similar to those in FIG. 6 will be appropriately omitted from description.

In this embodiment, the CPU 111 carried out control so as to execute cleaning of the secondary transfer roller 9 (S206), and then waits for resumption of the image formation until a timing becomes a timing when the post-resumption image leading end reaches the primary transfer portion N1 after the untransferred toner image leading end passes through the primary transfer portion N1 (S207). On the basis of an image signal input from the video controller 120 to the engine controller 110, constitutions (peripheral lengths) of the intermediary transfer belt 7 and the photosensitive drum 1, peripheral speeds of the intermediary transfer belt 7 and the photosensitive drum 1, and the like, the CPU 111 is capable of discriminating (calculating) a timing when the untransferred toner image leading end, the post-resumption image leading end, or a trailing end of the untransferred toner image region reaches or passes through the primary transfer portion N1.

FIG. 11 is a timing chart for illustrating an example of an operation in the case where the sheet absence is detected in this embodiment. FIG. 11 is an example in the case where the job is executed under a condition similar to the condition of FIG. 7. In FIG. 11, time progressions of the operations of the respective portions similar to those of FIG. 7 are schematically shown. The operations of the respective portions in accordance with this timing chart are controlled by the CPU 111. In FIG. 11, each of images of respective pages is formed of toner of at least one color in a substantially whole area of the image forming region.

The operations from T1 to T8 of FIG. 11 are similar to those from T1 to T8 of FIG. 7, respectively. The operations in FIG. 11 similar to those in FIG. 7 will be appropriately omitted from description.

Also, in this embodiment, similar to the comparison example, a toner image of a second page reaches the secondary transfer portion N2 after being primarily transferred onto the intermediary transfer belt 7, but at this time, the recording material S is not conveyed to the secondary transfer portion N2. Therefore, in this embodiment, similar to the comparison example, when the untransferred toner image passes through the secondary transfer portion N2, a voltage applied to the secondary transfer roller 9 is turned off (OFF) (0 V) so that the toner of the untransferred toner image is not deposited on the secondary transfer roller 9 in an amount as small as possible (T8, T9). Thereafter, cleaning of the secondary transfer roller 9 is executed (T9 to T14). Specifically, a cleaning voltage of the opposite polarity to the normal polarity of the toner is applied to the secondary transfer roller 9.

On the other hand, after image formation (exposure) for the second page is ended (T5), the image formation in the job is interrupted. Then, the image forming apparatus 100 waits for a timing so that after a timing (T10) when the untransferred toner image leading end passes through the primary transfer portion N1, a timing (T12) when the post-resumption image leading end reaches the primary transfer portion N1 arrives, re-image formation (exposure) for the second page which is the same as the untransferred toner image is started (T11). In the example of FIG. 11, the image formation is resumed so that the timing (T12) when the post-resumption image leading end reaches the primary transfer portion N1 arrives before the trailing end of the untransferred toner image region reaches the primary transfer portion N1 (T13). Further, after the re-image formation for this second page is started, the second sheet feeding roller 13B is driven, so that sheet feeding of the recording material S (first sheet after the switching, second sheet of the job) from the second cassette 12B after the automatic feeding portion switching is started (T15). The toner image of the second page by the re-image formation is primarily transferred onto the intermediary transfer belt 7 (T12 to T16), and then is secondarily transferred onto the recording material S (T17, T18).

Incidentally, the plurality of recording materials S are accommodated in the second cassette 12B, and therefore, a toner image of third page is secondarily transferred onto a recording material S conveyed from the second cassette 12B with a normal sheet interval.

Thus, in this embodiment, in the case where the automatic feeding portion switching is performed, the image formation is resumed so that the post-resumption image leading end reaches the primary transfer portion N1 after the untransferred toner image leading end passes through the primary transfer portion N1. That is, the untransferred toner image leading end passes through the secondary transfer portion N2 and then the intermediary transfer belt 7 is idle-rotated through one full circumference, and thereafter, the image forming region on the intermediary transfer belt 7 corresponding to the post-resumption image leading end reaches the secondary transfer portion N2. By this, it is possible to suppress the occurrence of the slipping-time image due to the toner of the untransferred toner image which is easy to slip through the cleaning blade 82.

10. Confirmation of Effect

The occurrence of the slipping-through image was evaluated by using the image forming apparatuses of this embodiment and the comparison example. A test was conducted in such a manner that 10 sheets of recording materials of the same kind (for example, A4-size plain paper) were accommodated in each of the first and second cassettes 12A and 12B and then a job of continuous image formation for 20 sheets (20 pages) was executed. A test image of each page was formed of toner of a single color (black as an example)

in a substantially whole area of the image forming region. The job was started by first feeding the recording material S from the first cassette 12A.

In either case of this embodiment and the comparison example, the automatic feeding portion switching was performed at the time when 10 sheets of the recording materials S were fed from the first cassette 12A. In the comparison example, on the first sheet after the automatic feeding portion switching, the slipping-through image due to the slipping-through of the toner of the untransferred toner image generated by the automatic feeding portion switching occurred. On the other hand, in this embodiment, on the first sheet after the automatic feeding portion switching, the slipping-through image due to the slipping-through of the toner of the untransferred toner image generated by the automatic feeding portion switching did not occur. In this embodiment, after the untransferred toner image leading end passes through the secondary transfer portion N2 and then the intermediary transfer belt 7 is idle-rotated through one full circumference, the image forming region on the intermediary transfer belt 7 corresponding to the post-resumption image leading end reaches the secondary transfer portion N2. Accordingly, before a first recording material S after the automatic feeding portion switching reaches the secondary transfer portion N2, the toner of the untransferred toner image leading end passed through the cleaning blade 82 passes through the secondary transfer portion N2. By this, in this embodiment, it was possible to suppress the occurrence of the slipping-through image due to the slipping-through of the untransferred toner image.

Thus, in this embodiment, the image forming apparatus 100 includes: the image forming portion P including the rotatable image bearing member (photosensitive drum) 1 and for carrying out image formation for forming the toner image on the image bearing member 1; the rotatable intermediary transfer member (intermediary transfer belt) 7 onto which the toner image is primarily transferred from the image bearing member 1 in the primary transfer portion N1; the secondary transfer member (secondary transfer roller) 9 for forming the secondary transfer portion N2 in which the toner image is secondarily transferred from the intermediary transfer member 7 onto the recording material S; the cleaning device 8 which is for removing the toner on the intermediary transfer member in the cleaning position downstream of the secondary transfer portion N2 and upstream of the primary transfer portion N1 with respect to the movement direction of the intermediary transfer member 7 and which is provided with the cleaning blade 82 contacting the surface of the intermediary transfer member 7 along the widthwise direction of the intermediary transfer member 7; the first feeding portion 12A and the second feeding portion 12B which are each for feeding the recording material S toward the secondary transfer portion N2; and the controller (CPU) 111 for carrying out control in which a feeding source of the recording material is changed from the first feeding portion 12A to the second feeding portion 12B in the case where the absence of the recording material in the first feeding portion 12A is detected after the above-described image formation is started, and in addition, carries out control in which the image formation for forming the toner image to be secondarily transferred onto the recording materials fed from the second feeding portion 12B is resumed. Further, in the case where the feeding source of the recording materials is changed from the first feeding portion 12A to the second feeding portion 12B, when the toner image passing through the secondary transfer portion N2 without being transferred onto the recording material S before the recording material S fed from the second feeding portion 12B reaches the secondary transfer portion N2 is the untransferred toner image, the position of the leading end of the untransferred toner image on the intermediary transfer member 7 with respect to the conveying direction is the untransferred toner image leading end, and the position of the leading end of an image forming region, on the intermediary transfer member with respect to the conveying direction, in which the first toner image after resumption of the image formation is formable is the post-resumption image leading end, the controller 111 carries out control in which the image formation is resumed so that the post-resumption image leading end first reaches the primary transfer portion N1 after the untransferred toner image leading end first passes through the primary transfer portion N1.

In this embodiment, the cleaning device 8 includes the container 81, the supporting member 83 fixed to the container 81, and the cleaning blade 82 fixed on the supporting member 83. Further, the cleaning blade 82 contacts the intermediary transfer member 7 so as to extend in the counter direction to the movement direction of the intermediary transfer member 7, and the cleaning blade 82 is set to 65° to 75° in rubber hardness, 12° to 18° in set angle $\theta 1$, and 0.3 mm to 1.2 mm in penetration amount $\delta$ into the intermediary transfer member 7. Preferably, the controller 111 carries out control in which the image formation is resumed so that the post-resumption image leading end leading end first reaches the primary transfer portion before the untransferred toner image leading end first passed through the primary transfer portion N1 subsequently reaches the secondary transfer portion. Further, when the image forming region on the intermediary transfer member 7 on which the untransferred toner image is capable of being present is the untransferred toner image region, preferably, the controller 111 carries out control in which the image formation is resumed so that before the leading end of the untransferred toner image region with respect to the conveying direction first passed through the primary transfer portion N1 subsequently reaches the secondary transfer portion N2, the post-resumption image leading end first reaches the primary transfer portion N1. Here, the untransferred toner image leading end may be at least one of leading end positions of the toner image formed in any position with respect to the widthwise direction of the intermediary transfer member 7.

Preferably, the untransferred toner image leading end is a leading end position, of the toner image positioned on a most downstream side in the conveying direction, of leading end positions of the toner image formed in any position with respect to a widthwise direction of the intermediary transfer member 7.

As described above, according to this embodiment, it is possible to suppress the occurrence of the image defect due to the slipping-time of the toner of the untransferred toner image generated by the automatic feeding portion switching. According to this embodiment, even in a constitution in which the contact pressure of the cleaning blade 82 to the intermediary transfer belt 7 is set relatively low, the occurrence of the image defect due to the slipping-through of the toner of the untransferred toner image can be suppressed. That is, the control of the timing when the image formation is resumed in the case where the automatic feeding portion switching in accordance with the present invention can be said to be effective particularly in the constitution in which the contact pressure of the cleaning blade 82 to the intermediary transfer belt 7 is set relatively low.

Embodiment 2

Next, another embodiment of the present invention will be described. Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

This embodiment is different from the embodiment 1 in constitution of a belt cleaning device 8. FIG. 12 is a schematic sectional view showing the belt cleaning device 8 in this embodiment. FIG. 12 shows a cross section substantially perpendicular to the widthwise direction of the intermediary transfer belt 7.

In this embodiment, the cleaning blade 82 is provided switchably (rotatably) relative to the belt cleaning device 8. That is, in this embodiment, in each of opposite end portions of the supporting member 83 with respect to the longitudinal direction (widthwise direction of the intermediary transfer belt 7, longitudinal direction of the cleaning blade 82), a switch supporting portion 83*a* is provided. Further, the supporting member 83 is mounted to the collecting container 81 so that the switch supporting portion 83*a* in each of the opposite end portions thereof is switchable through a switch shaft 86. The switch shaft 86 is provided on a side downstream of the cleaning nip Q with respect to the surface movement direction of the intermediary transfer belt 7. Further, the switch shaft 86 is disposed substantially parallel to the widthwise direction (longitudinal direction of the cleaning blade 82) of the intermediary transfer belt 7. By this, the supporting member 83 is rotatable about the switch shaft 86, i.e., a switch axis substantially parallel to the widthwise direction (longitudinal direction of the cleaning blade 82) of the intermediary transfer belt 7. Further, by this, the cleaning blade 82 fixed on the supporting member 83 is switchable about the switch shaft 86 so that an edge portion 82*a* thereof is moved in directions toward and away from the intermediary transfer belt 7. Further, the supporting member 83 is pressed by a pressing spring 87 which is an urging member as an urging means so that the edge portion 82*a* of the leading end (free end) of the cleaning blade 82 is rotated in the direction toward the intermediary transfer belt. In this embodiment, the pressing spring 87 is constituted by a compression coil spring. By this, the cleaning blade 82 is pressed toward the tension roller 74 through the intermediary transfer belt 7.

The constitution in which the cleaning blade 82 is switchable (switchable system) can be said as a constitution in which the slipping-through the toner is liable to occur since the edge portion 82*a* of the free end of the cleaning blade 82 is movable in the direction away from the intermediary transfer belt 7. Particularly, in this embodiment, the switch shaft 86 is disposed in a position in which when the intermediary transfer belt 7 is rotated, a frictional force between the cleaning blade 82 and the intermediary transfer belt 7 acts so that the cleaning blade 82 is rotated in the direction away from the intermediary transfer belt 7. This arrangement of the switch shaft 86 will be further described using FIG. 13.

Parts (a) and (b) of FIG. 13 are schematic sectional views in the neighborhood of the cleaning nip Q for illustrating the arrangement of the switch shaft 86. Each of parts (a) and (b) of FIG. 13 shows cross section substantially perpendicular to the widthwise direction of the intermediary transfer belt 7.

In parts (a) and (b) of FIG. 13, a contact point between the edge portion 82*a* of the free end of the cleaning blade 82 and the surface of the intermediary transfer belt 7 is a contact point G, a tangential line of the intermediary transfer belt 7 at the contact point G is a tangential line G, a rectilinear line passing through the contact point G and the switch shaft (switch center) 86 is a rectilinear line LA, and an angle formed between the tangential line L3 and the rectilinear line L4 on the basis of the contact point G is a switch angle θ2.

At this toner image, as shown in part (a) of FIG. 13, the switch angle θ2 in the case where the rectilinear line L4 is on the cleaning blade 82 side relative to the tangential line L3 with respect to the contact point G is defined as an angle on a positive (+) side. In a constitution in which the switch shaft 86 is thus disposed, when the intermediary transfer belt 7 is rotated, the frictional force between the cleaning blade 82 and the intermediary transfer belt 7 acts so that the cleaning blade 82 is rotated in the direction toward the intermediary transfer belt 7. Accordingly, in this constitution, when the intermediary transfer belt 7 is rotated, there is a tendency that the frictional force between the cleaning blade 82 and the intermediary transfer belt 7 becomes large. For that reason, in this constitution, the coefficient of kinetic friction in the contact portion between the cleaning blade 82 and the intermediary transfer belt 7 becomes large, so that the blade squeaking (occurrence of noise) becomes liable to occur in the case where a frictional force between the cleaning blade 82 and the intermediary transfer belt 7 becomes large or in the like case. The coefficient of kinetic friction in the contact portion between the cleaning blade 82 and the intermediary transfer belt 7 becomes large in some instances due to that image formation with a low print ratio is continued and that a cumulative use amount of the intermediary transfer belt 7 is increased, or the like.

On the other hand, as shown in part (b) of FIG. 13, the switch angle θ2 in the case where the rectilinear line L4 is on the intermediary transfer belt 7 side relative to the tangential line L3 with respect to the contact point G is defined as an angle on a negative (−) side. In other words, the switch angle θ2 in the case where the switch shaft 86 is positioned between the tangential line L3 and the intermediary transfer belt 7 is an angle on the negative (−) side. In a constitution in which the switch shaft 86 is thus disposed, when the intermediary transfer belt 7 is rotated, the frictional force between the cleaning blade 82 and the intermediary transfer belt 7 acts so that the cleaning blade 82 is rotated in the direction away from the intermediary transfer belt 7. Accordingly, in this constitution, when the intermediary transfer belt 7 is rotated, it is possible to suppress that the frictional force between the cleaning blade 82 and the intermediary transfer belt 7 becomes large. For that reason, according to this constitution, the blade squeaking can be made harder to occur than in the constitution of part (a) of FIG. 13.

In this embodiment, as shown in part (b) of FIG. 13, the switch shaft 86 is disposed so that the switch angle θ2 becomes the angle on the negative (−) side. For that reason, in this embodiment, the blade squeaking becomes hard to occur. However, in the constitution in which the switch angle θ2 is the angle on the negative side, the dynamic pressure of the cleaning blade 82 to the intermediary transfer belt 7 when the intermediary transfer belt 7 is rotated becomes liable to lower than in the constitution in which the switch angle θ2 in the angle on the positive side. For that reason, the constitution in which the switch angle θ2 is the angle on the negative side is more liable to cause the slipping-time of the toner of the untransferred toner image in the case where the automatic feeding portion switching is performed than in the constitution in which the switch angle θ2 is the angle on the positive side.

Therefore, in this embodiment, in the case where the automatic feeding portion switching is performed, the timing when the image formation is resumed is controlled in accordance with the present invention similarly as in the embodiment 1. By this, the occurrence of the slipping-through of the toner of the untransferred toner image can be suppressed.

Thus, in this embodiment, the cleaning device 8 includes the container 81, the supporting member 83 mounted to the container so as to be switchable about the switch shaft 86, and the cleaning blade 82 fixed on the supporting member 83 and switchable about the switch shaft 86 so as to move in the directions toward and away from the intermediary transfer belt 7 by switching the supporting member 83. Further, in this embodiment, the cleaning blade 82 contacts the intermediary transfer belt 7 so as to extend in the counter direction to the surface movement direction of the intermediary transfer belt 7. Further, the switch shaft 86 is disposed on the side downstream of the contact portion between the cleaning blade 82 and the intermediary transfer belt 7 with respect to the surface movement direction of the intermediary transfer belt 7. Further, in the cross section substantially perpendicular to the widthwise direction of the intermediary transfer belt 7, the contact point between the cleaning blade 82 and the intermediary transfer belt 7 is the contact point G, and the tangential line of the intermediary transfer belt 7 at the contact point G is the tangential line L3. Further, the rectilinear line passing through the contact point G and the switch shaft 86 is the rectilinear line LA, and the angle formed between the tangential line L3 and the rectilinear line LA is the switch angle θ2 on the basis of the contact point G is the switch angle θ2. At this time, the switch angle θ2 is set so that the rectilinear line LA is positioned on the intermediary transfer belt 7 side relative to the tangential line L3.

As described above, according to this embodiment, similarly as in the embodiment 1, it is possible to suppress the occurrence of the image defect due to the slipping-through of the toner of the untransferred toner image generated by the automatic feeding portion switching. According to this embodiment, even in a constitution in which the cleaning blade 82 is switchable, particularly in the constitution in which the switch angle θ2 is the angle on the negative side, the occurrence of the image defect due to the slipping-through of the toner of the untransferred toner image can be suppressed. That is, the control of the timing when the image formation is resumed in the case where the automatic feeding portion switching in accordance with the present invention can be said to be effective particularly in the constitution in which the cleaning blade 82 is switchable, especially in the constitution in which the switch angle θ2 is the angle on the negative side.

Embodiment 3

Next, another embodiment of the present invention will be described.

Basic constitutions and operations of an image forming apparatus in this embodiment are the same as those of the image forming apparatus in the embodiment 1. Accordingly, in the image forming apparatus in this embodiment, elements having the same or corresponding functions and constitutions as those in the image forming apparatus in the embodiment 1 are represented by the same reference numerals or symbols as those in the embodiment 1 and will be omitted from detailed description.

In this embodiment, a modified embodiment relating to control of a voltage applied to the secondary transfer portion N2 when the untransferred toner image generated by the automatic feeding portion switching passes through the secondary transfer portion N2 or when the secondary transfer roller 9 is cleaned will be described. Herein, respective embodiments will be described as that the modified embodiments are applied to the image forming apparatus 100 having the constitution of the embodiment 1, but the respective modified embodiments may also be applied to the image forming apparatus 100 having the constitution of the embodiment 2.

Modified Embodiment 1

In the embodiment 1, when the untransferred toner image generated by the automatic feeding portion switching first passes through the secondary transfer portion N2, the voltage applied to the secondary transfer roller 9 was turned off (OFF) (0 V). According to the control of the embodiment 1, it is possible to suppress the occurrence of the slipping-through image due to the toner of the untransferred toner image leading end which readily causes the slipping-through phenomenon. However, there is a possibility that a part of the toner of this untransferred toner image leading end is deposited on the secondary transfer roller 9 when subsequently reaches the secondary transfer portion N2 and thus the secondary transfer roller 9 is contaminated with the deposited toner. This contamination of the secondary transfer roller 9 causes back (surface) contamination of the recording material S. Incidentally, the "untransferred toner image leading end" is as described in the embodiment 1.

Therefore, in a predetermined period including a period in which at least the untransferred toner image leading end first passes through the secondary transfer portion N2, a voltage of the same polarity (i.e., the positive polarity opposite to the normal charge polarity of the toner) during the secondary transfer (herein, this voltage is referred to as a "leading end voltage") is applied. By this, when the untransferred toner image leading end passes through the secondary transfer portion N2, at least a part of the toner of the untransferred toner image leading end is deposited on the secondary transfer roller 9, so that a toner application amount of the toner of the untransferred toner image leading end on the intermediary transfer belt 7 can be reduced.

Further, in this embodiment, after the leading end voltage is applied for the predetermined period, a voltage (cleaning voltage) of the opposite polarity (i.e., the negative polarity which is the same as the normal charge polarity of the toner) during the secondary transfer is applied to the secondary transfer roller 9. By this, deposition of the toner of the untransferred toner image on the secondary transfer roller 9 is suppressed, and in addition, the toner deposited on the secondary transfer roller 9 can be moved (returned) to the intermediary transfer belt 7.

Parts (a) and (b) of FIG. 14 are timing charts each showing an example of progression of presence/absence of the toner image on the intermediary transfer belt 7 and the voltage applied to the secondary transfer roller 9 in the neighborhood of a period in which the untransferred toner image passes through the secondary transfer portion N2 in this modified embodiment. In this case, an image of each page is formed with toner of at least one color in a substantially whole area of the image forming region.

As shown in part (a) of FIG. 14, for the predetermined period from the toner image when the untransferred toner image leading end reaches the secondary transfer portion N2, the voltage (leading end voltage) of the opposite polarity to the normal charge polarity of the toner is applied to the secondary transfer roller 9. For example, as shown in part (a) of FIG. 14, for a period corresponding to one full circumference of the secondary transfer roller 9, the leading end voltage is applied to the secondary transfer roller 9. The period for which the leading end voltage is applied to the secondary transfer roller 9 is not limited to the period corresponding to the one full circumference of the secondary transfer roller 9, but may also be shorter or longer than this period. For example, the period for which the leading end voltage is applied to the secondary transfer roller 9 can be made a period of less than a full circumference of the secondary transfer roller 9 (for example, a period corresponding to ½ of the one full circumference of the secondary transfer roller 9). Further, for example, the period for which the leading end voltage is applied to the secondary transfer roller 9 can be made a period exceeding the one full circumference of the secondary transfer roller 9 (for example, a period corresponding to 2 to 5 full circumferences). For example, as shown in part (b) of FIG. 14, the leading end voltage application period can be made a period (period corresponding to a length substantially equal to a length of the untransferred toner image region) corresponding to a length substantially equal to a length of the untransferred toner image with respect to the recording material conveying of the intermediary transfer belt 7. Further, the application of the leading end voltage to the secondary transfer roller 9 may be started before the untransferred toner image leading end or the leading end of the untransferred toner image reaches the secondary transfer portion N2. Further, an absolute value of the leading end voltage may be identical to or different from an absolute value of the voltage during the secondary transfer. In this modified embodiment, the leading end voltage was +2 kV. The leading end voltage is applied to the secondary transfer roller 9, and thus at least a part of the toner of the untransferred toner image leading end is deposited on the secondary transfer roller 9, so that the toner application amount of the toner of the untransferred toner image leading end on the intermediary transfer belt 9 can be reduced.

Further, as shown in parts (a) and (b) of FIG. 14, the leading end voltage is applied to the secondary transfer roller 9 for the predetermined period, and thereafter, the voltage (cleaning voltage) of the same polarity as the normal charge polarity of the toner is applied to the secondary transfer roller 9 for a predetermined period. The period for which the cleaning voltage is applied to the secondary transfer roller 9 may preferably include a period until a trailing end (which may be a trailing end of the untransferred toner image region) of the untransferred toner image passes through the secondary transfer portion N2. Further, similarly as in the embodiment 1, also after the untransferred toner image region passes through the secondary transfer portion N2, the cleaning voltage can be continuously applied to the secondary transfer roller 9 (for example, for a period corresponding to 1 to 10 full circumferences, typically 2 to 5 full circumferences). An absolute value of the cleaning voltage may be identical to or different from an absolute value of the voltage during the secondary transfer. In this modified embodiment, the cleaning voltage was −300 V. By applying the cleaning voltage to the secondary transfer roller 9, the toner of the untransferred toner image collected onto the secondary transfer roller 9 can be discharged to the intermediary transfer belt 7.

Thus, when at least the untransferred toner image leading end passes through the secondary transfer portion N2, by applying the voltage of the opposite polarity to the normal charge polarity of the toner to the secondary transfer roller 9, at least a part of the toner of the untransferred toner image leading end is collected onto the secondary transfer roller 9. By this, the toner application amount of the toner of the untransferred toner image leading end on the intermediary transfer belt 7 is reduced, so that it is possible to suppress that the toner is deposited on the secondary transfer roller 9 when the untransferred toner image leading end subsequently reaches the secondary transfer portion N2. Incidentally, as in this modified embodiment, the control in which the leading end voltage is applied to the secondary transfer roller 9 is capable of being intended to be combined with the control as in the above-described comparison example. That is, by applying the leading end voltage to the secondary transfer roller 9, whereby the toner application amount of the toner of the untransferred toner image leading end on the intermediary transfer belt 7 can be reduced. By this, it is possible to suppress breakage of the inhibition layer when the untransferred toner image leading end reaches the cleaning nip Q. Accordingly, the slipping-through of the toner of the untransferred toner image leading end can be suppressed. For that reason, as in the comparison example, even in the control in which the untransferred toner image leading end is capable of overlapping with the image forming region after the image formation is resumed, it can be expected that the occurrence of the slipping-through image due to the slipping-through of the toner of the untransferred toner image is capable of being suppressed.

Modified Embodiment 2

A modified embodiment 2 is different from the modified embodiment 1 in cleaning voltage. Part (a) of FIG. 15 is a timing chart showing an example of progression of presence/absence of the toner image on the intermediary transfer belt 7 and the voltage applied to the secondary transfer roller 9 in the neighborhood of a period in which the untransferred toner image passes through the secondary transfer portion N2 in this modified embodiment. In this case, an image of each page is formed with toner of at least one color in a substantially whole area of the image forming region.

In this modified embodiment, after the leading end voltage (+2 kV in this modified embodiment) is applied to the secondary transfer roller 9 for a predetermined period, a voltage is changed stepwise from 0 V to −300 V and is applied to the secondary transfer roller 9. In this modified embodiment, the voltage including 0 V is referred to as the cleaning voltage. Specifically, for every one full circumference of the secondary transfer roller 9, the cleaning voltage is lowered by −100 V in an order of 0 V, −100 V, −200 V, and −300 V (i.e., an absolute value thereof is made larger on the negative polarity side). The final cleaning voltage of −300 V was continuously applied to the secondary transfer roller 9 even after the untransferred toner image region passes through the secondary transfer portion N2 similarly as in the embodiment 1. A whole period in which the cleaning voltage is applied to the secondary transfer roller 9 may preferably include a period until a trailing end (which may be a trailing end of the untransferred toner image region) of the untransferred toner image passes through the secondary transfer portion N2. The number of stages in which the voltage is changed, a layer (of toner image) of each stage, and a value of the voltage in each stage are not limited to those in this modified embodiment. For example, the voltage may also be changed during one full circumference of the secondary transfer roller 9. Thus, by increasing the absolute value of the cleaning voltage stepwise, an amount of the toner, of the untransferred toner image collected onto the secondary transfer roller 9, discharged toward the intermediary transfer belt 7 side can be made gradually larger from a leading end side toward a trailing end side of the untransferred toner image. By this, the toner amount of the toner conveyed to the cleaning nip Q can be gradually increased from a region close to the untransferred toner image leading end where the slipping-through of the toner is liable to occur, toward a region remote from the untransferred toner image leading end.

Modified Embodiment 3

A modified embodiment 3 is different from the modified embodiment 2 in leading end voltage. Part (b) of FIG. 15 is a timing chart showing an example of progression of presence/absence of the toner image on the intermediary transfer belt 7 and the voltage applied to the secondary transfer roller 9 in the neighborhood of a period in which the untransferred toner image passes through the secondary transfer portion N2 in this modified embodiment. In this case, an image of each page is formed with toner of at least one color in a substantially whole area of the image forming region.

In this modified embodiment, when the untransferred toner image leading end reaches the secondary transfer portion N2, a voltage is changed stepwise from +2 kV to 0 V and is applied to the secondary transfer roller 9. The final voltage of 0 V can be regarded as the cleaning voltage. Specifically, for every one full circumference of the secondary transfer roller 9, the cleaning voltage is lowered by 500 V in an order of +2 kV, +1.5 kV, +1.0 kV, +500 V, and 0 V (i.e., an absolute value thereof is made smaller toward the negative polarity side). The number of stages in which the voltage is changed, a layer (of toner image) of each stage, and a value of the voltage in each stage are not limited to those in this modified embodiment. For example, the voltage may also be changed during one full circumference of the secondary transfer roller 9. Thus, by decreasing the absolute value of the leading end voltage stepwise, an amount of the toner of the untransferred toner image collected onto the secondary transfer roller 9 can be made gradually smaller from a leading end side toward a trailing end side of the untransferred toner image. By this, the toner in a region closer to the untransferred toner image leading end where the slipping-through of the toner is liable to occur can be collected on the secondary transfer roller 9 in a larger amount. Further, the toner in a region more remote from the untransferred toner image leading end is made harder to be deposited on the secondary transfer roller 9, so that the contamination of the secondary transfer roller 9 with the toner of the untransferred toner image can be suppressed.

Further, in this modified embodiment, after the leading end voltage is changed stepwise and is applied, for a predetermined period, the cleaning voltage (−300 V in this modified embodiment) is applied to the secondary transfer roller 9. At this time, the cleaning voltage may be changed stepwise similarly as in the modified embodiment 2.

Thus, in this embodiment, the controller 111 carries out control so that the voltage of the same polarity as the polarity of the voltage when the toner image is transferred onto the recording material S is applied to the secondary transfer portion N2 in the predetermined period including the period in which the untransferred toner image leading end first passes through the secondary transfer portion N2. In the predetermined period, the controller 111 is capable of carrying out control so that, as the same polarity voltage, a first voltage of the same polarity and a second voltage of the same polarity smaller in absolute value than the first voltage of the same polarity are applied to the secondary transfer portion N2, with the result that the second voltage of the same polarity is applied after the first voltage of the same polarity. Further, in this embodiment, the controller 111 carries out control so that the voltage of the opposite polarity to the polarity of the voltage when the toner image is transferred onto the recording material S is applied to the secondary transfer portion N2 in a second predetermined period which is after the above-described predetermined period and which is before the recording material S onto which the first toner image after the resumption of the image formation in the case where the automatic feeding portion switching is performed is secondarily transferred reaches the secondary transfer portion N2. In the second predetermined period, as the opposite polarity voltage, the controller 111 is capable of carrying out control so that a first voltage of the opposite polarity and a second voltage of the opposite polarity larger in absolute voltage than the first voltage of the opposite polarity are applied to the secondary transfer portion N2, with the result that the second voltage of the opposite polarity is applied after the first voltage of the opposite polarity.

Other Embodiments

As described above, the present invention was described in accordance with the specific embodiments, but the present invention is not limited to the above-described specific embodiments.

In the above-described embodiments, the case where the region on the intermediary transfer belt 7 corresponding to the post-resumption image leading end reaches the secondary transfer portion after the untransferred toner image leading end passes through the secondary transfer portion and then the intermediary transfer belt is idle-rotated through one full circumference was described. However, the intermediary transfer belt may be idle-rotated through a plurality of full circumferences.

Further, the voltage applied to the secondary transfer roller is not limited to the values described in the above-described embodiments. Further, the voltages changed stepwise in the modified embodiments described in the embodiment 3 may also be changed linearly or curvedly.

Further, the image forming apparatus may have a constitution (for example, a multi-function machine provided with functions of the copying machine, the printer, and the facsimile machine) in which an image is formable on the basis of an image signal from an image reading portion provided or connected to the image forming apparatus.

Further, the number of the feeding portions (such as cassettes) provided in the image forming apparatus is not limited to two, but more feeding portions, for example three feeding portions, may also be provided.

Further, in the cleaning of the secondary transfer roller, voltages of polarities identical and opposite to the polarity of the voltage when the toner image is transferred onto the recording material may be alternately applied, or the like.

Further, an outer roller corresponding to the secondary transfer roller in the above-described embodiments is electrically grounded, and to an inner roller corresponding to the secondary transfer opposite roller in the above-described embodiments, the voltage of the same polarity as the normal charge polarity of the toner is applied, so that the secondary transfer voltage may be applied to the secondary transfer portion.

Further, the secondary transfer member is not limited to a roller-shaped member, but may also be a brush-shaped member, a sheet-shaped member, a film-shaped member, a pad-shaped member, and the like member. The same applies to the primary transfer member.

Further, the image forming region may be substantially equal to a size of the recording material, and may also be smaller or larger than the size of the recording material. In the case where the image forming region is smaller than the size of the recording material, typically, a margin (portion) where the image is not formed is provided in each of a leading end portion and a trailing end portion with respect to the recording material conveying direction and opposite end portions with respect to a direction substantially perpendicular to the recording material conveying direction. In the case where the image forming region is larger than the size of the recording material, typically, the image forming region is provided with a portion protruded from the size of the recording material in each of the leading end portion and the trailing end portion with respect to the recording material conveying direction and the opposite end portions with respect to the direction substantially perpendicular to the recording material conveying direction. However, the above-described margin and the protruded portion may be provided only in either of the leading end portion and the trailing end portion with respect to the recording material conveying direction, and of the opposite end portions with respect to the direction substantially perpendicular to the recording material conveying direction.

According to the present invention, it is possible to suppress the occurrence of the image defect, in a subsequent image, due to the job of the untransferred toner image on the intermediary transfer member generated by the automatic feeding portion switching.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-030753 filed on Feb. 29, 2024, which is hereby incorporated by reference herein in its entirety.

What is claimed is:

1. An image forming apparatus comprising:

an image forming portion including a rotatable image bearing member and configured to carry out image formation in which a toner image is formed on the image bearing member;

a rotatable intermediary transfer member onto which the toner image is primarily transferred from the image bearing member in a primary transfer portion;

a secondary transfer member configured to form a secondary transfer portion in which the toner image is secondarily transferred from the intermediary transfer member onto a recording material;

a cleaning blade configured to clean a surface of the intermediary transfer member in contact with the surface of the intermediary transfer member at a cleaning position downstream of the secondary transfer portion and upstream of the primary transfer portion with respect to a movement direction of the intermediary transfer member;

a first feeding portion and a second feeding portion which are each configured to feed the recording material toward the secondary transfer portion; and a controller configured to control the image forming portion, the controller, when the recording material being fed from the first feeding portion runs out while image formation is in process, interrupting the image formation, and then controlling the image forming portion to resume image formation with recording material fed from the second feeding portion, wherein in a case where the feeding source of the recording material is changed from the first feeding portion to the second feeding portion after the recording material is absent in the first feeding portion, when a toner image passing through the secondary transfer portion without being transferred onto the recording material before the recording material fed from the second feeding portion reaches the secondary transfer portion is an untransferred toner image, a position of a leading end of the untransferred toner image on the intermediary transfer member with respect to a conveying direction of the intermediary transfer member is an untransferred toner image leading end, a position of a leading end of an image forming region, on the image bearing member with respect to a conveying direction of the image bearing member, in which a first toner image after resumption of the image formation is formable is a post-resumption image leading end, and a timing when a position of the intermediary transfer member on which the untransferred toner image leading end is transferred passes through the cleaning position and then first passes through the primary transfer portion is a first timing, the controller controls the image forming portion to carry out control in which the image formation is resumed so that a timing when the post-resumption image leading end first reaches the primary transfer portion is a second timing after the first timing.

2. An image forming apparatus according to claim 1, wherein when the timing from the first timing until the intermediary transfer member completes one full rotation is defined as a third timing, the controller carries out control in which the image formation is resumed so that the second timing is before the third timing.

3. An image forming apparatus according to claim 1, wherein the controller carries out control in which the image formation is resumed so that the post-resumption image leading end first reaches the primary transfer portion before the position of the intermediary transfer member on which the untransferred toner image leading end is transferred passes through the cleaning position and then first reaches the secondary transfer portion.

4. An image forming apparatus according to claim 1, wherein when an image forming region on the intermediary transfer member on which the untransferred toner image is capable of being present is an untransferred toner image region, the controller carries out control in which the image formation is resumed so that before a trailing end of the untransferred toner image region with respect to the conveying direction passes through the cleaning position and then first reaches the primary transfer portion, the post-resumption image leading end first reaches the primary transfer portion.

5. An image forming apparatus according to claim 1, wherein the untransferred toner image leading end is at least one of leading end positions of the toner image formed in any position with respect to a widthwise direction of the intermediary transfer member.

6. An image forming apparatus according to claim 1, wherein the untransferred toner image leading end is a leading end position, of the toner image positioned on a most downstream side in the conveying direction, of leading end positions of the toner image formed in any position with respect to a widthwise direction of the intermediary transfer member.

7. An image forming apparatus according to claim 1, further comprising a cleaning device, wherein the cleaning device includes a container, a supporting member mounted to the container so as to be swingable about a swing shaft, and the cleaning blade fixed on the supporting member and swingable about the swing shaft by swinging of the supporting member so that the cleaning blade is moved in a direction toward the intermediary transfer member and in a direction away from the intermediary transfer member.

8. An image forming apparatus according to claim 7, wherein the cleaning blade contacts the intermediary transfer member so as to extend in a counter direction to a movement direction of the intermediary transfer member, wherein the swing shaft is provided on a side downstream of a contact portion between the cleaning blade and the intermediary transfer member with respect to the movement direction of the intermediary transfer member, and wherein in a cross-section substantially perpendicular to a widthwise direction of the intermediary transfer member, when a contact point between the cleaning blade and the intermediary transfer member is a contact point G, a tangential line of the intermediary transfer member at the contact point G is a tangential line L3, a rectilinear line passing through the contact point G and the swing shaft is a rectilinear line LA, and an angle formed between the tangential line L3 and the rectilinear line L4 with the contact point G as the vertex is a swing angle θ2, the swing angle θ2 is set so that the swing shaft is positioned on intermediary transfer member side relative to the tangential line L3.

9. An image forming apparatus according to claim 1, further comprising a cleaning device, wherein the cleaning device includes a container, a supporting member mounted to the container, and the cleaning blade fixed on the supporting member.

10. An image forming apparatus according to claim 9, wherein the cleaning blade contacts the intermediary transfer member so as to extend in a counter direction to a movement direction of the intermediary transfer member, and wherein the cleaning blade is set to 65° to 75° in rubber hardness, 12° to 18° in set angle, and 0.3 mm to 1.2 mm in penetration amount into the intermediary transfer member.

11. An image forming apparatus according to claim 1, further comprising an applying portion configured to apply a voltage to the secondary transfer portion, wherein the controller carries out control so that a voltage of an identical polarity to a polarity of a voltage when the toner image is transferred onto the recording material is applied to the secondary transfer portion in a predetermined period including a period in which the untransferred toner image leading end first passes through the secondary transfer portion.

12. An image forming apparatus according to claim 11, wherein the controller carries out control so that as the voltage of the identical polarity, a first voltage of the identical polarity and a second voltage of the identical polarity lower in absolute value than the first voltage of the identical polarity are applied to the secondary transfer portion in the predetermined period in an order such that the second voltage of the identical polarity is applied after the first voltage of the identical polarity.

13. An image forming apparatus according to claim 12, wherein in a second predetermined period after the predetermined period and before the recording material onto which the first toner image after resumption of the image formation is secondarily transferred reaches the secondary transfer portion, the controller carries out control so that a voltage of an opposite polarity to the polarity of the voltage when the toner image is transferred onto the recording material is applied to the secondary transfer portion.

14. An image forming apparatus according to claim 13, wherein the controller carries out control so that as the voltage of the opposite polarity, a first voltage of the opposite polarity and a second voltage of the opposite polarity higher in absolute value than the first voltage of the opposite polarity are applied to the secondary transfer portion in the second predetermined period in an order such that the second voltage of the opposite polarity is applied after the first voltage of the opposite polarity.

* * * * *